United States Patent
Rejeb Sfar et al.

(10) Patent No.: US 12,462,438 B2
(45) Date of Patent: Nov. 4, 2025

(54) MACHINE-LEARNING FOR 3D OBJECT DETECTION

(71) Applicant: Dassault Systemes, Vélizy-Villacoublay (FR)

(72) Inventors: Asma Rejeb Sfar, Vélizy-Villacoublay (FR); Tom Durand, Vélizy-Villacoublay (FR); Ashad Hosenbocus, Vélizy-Villacoublay (FR)

(73) Assignee: Dassault Systemes, Velizy-Villacoublay (FR)

( * ) Notice: Subject to any disclaimer, the term of this patent is extended or adjusted under 35 U.S.C. 154(b) by 993 days.

(21) Appl. No.: 17/553,403

(22) Filed: Dec. 16, 2021

(65) Prior Publication Data
US 2022/0189070 A1 Jun. 16, 2022

(30) Foreign Application Priority Data
Dec. 16, 2020 (EP) .................................... 20306588

(51) Int. Cl.
G06T 9/00 (2006.01)
G06N 3/088 (2023.01)
G06V 10/74 (2022.01)
G06V 10/82 (2022.01)

(52) U.S. Cl.
CPC .............. G06T 9/002 (2013.01); G06N 3/088 (2013.01); G06V 10/761 (2022.01); G06V 10/82 (2022.01)

(58) Field of Classification Search
CPC ...... G06T 9/002; G06V 10/761; G06V 10/82; G06N 3/088

USPC .............................................. 703/1
See application file for complete search history.

(56) References Cited

U.S. PATENT DOCUMENTS

2020/0027247 A1   1/2020   Minnen et al.
2020/0099954 A1   3/2020   Hemmer et al.

FOREIGN PATENT DOCUMENTS

JP   2020-191077 A   11/2020
JP   2024-538685 A   10/2024

OTHER PUBLICATIONS

Matsuzaki_2019 (Binary Representation for 3D Point Cloud Compression Based on Deep Auto-encoder, IEEE 8th Global Conference on Consumer Electronics (GCCE)) (Year: 2019).*
Giancola_2019 (Leveraging Shape Completion for 3D Siamese Tracking, IEEE/CVF Conference on Computer Vision and Pattern Recognition (CVPR) 2019) (Year: 2019).*
(Continued)

*Primary Examiner* — Brian S Cook
(74) *Attorney, Agent, or Firm* — Oblon, McClelland, Maier & Neustadt, L.L.P.

(57) ABSTRACT

A computer-implemented method of machine-learning for learning a neural network that encodes a super-point of a 3D point cloud into a latent vector. The method including obtaining a dataset of super-points. Each super-point is a set of points of a 3D point cloud. The set of points represents at least a part of an object. The method further includes learning the neural network based on the dataset of super-points. The learning includes minimizing a loss. The loss penalizes a disparity between two super-points. This constitutes improved machine-learning for 3D object detection.

15 Claims, 9 Drawing Sheets

(56) References Cited

OTHER PUBLICATIONS

Landrieu_2018 (Large-scale Point Cloud Semantic Segmentation with Superpoint Graphs, 2018 IEEE Conference on Computer Vision and Pattern Recognition (CVPR 2018), Jun. 2018, Salt Lake City, United States). (Year: 2018).*
Ishtayeh_2014 (Similarity Threshold Determination for Test Document Clustering, 2014). (Year: 2014).*
Landrieu_2017 (Weakly Supervised Segmentation-Aided Classification of Urban Scenes from 3D LIDAR point clouds, The international Achieves of the Photogrammetry, Remote Sensing and Spatial Information Sciences, vol. XLII-1/W1, 2017 ISPRS Hannover Workshop). (Year: 2017).*
Matsuzaki et al.—"Binary Representation for 3D Point Cloud Compression Based on Deep Auto-encoder", 2019 IEEE $8^{th}$ Global Conference on Consumer Electronics (GCCE) (2 pages).
Giancola et al.—"Leveraging Shape Completion for 3D Siamese Tracking", 2019 IEEE/CVF Conference on Computer Vision and Pattern Recognition (CVPR), (10 pages).
Elbaz et al—"3D Point Cloud Registration for Localization using a Deep Neural Network Auto-Encoder", 2017 IEEE Conference on Computer Vision and Pattern Recognition (10 pages).
Yue et al.—"A LiDAR Point Cloud Generator: from a Virtual World to Autonomous Driving", Mar. 31, 2018 (7 pages).
Yang et al.—"Toward the Repeatability and Robustness of the Local Reference Frame for 3D Shape Matching: An Evaluation", IEEE Transactions on Image Processing, vol. 27, No. 8, Aug. 2018 (16 pages).
Xie et al.—"MLCVNet: Multi-Level Context VoteNet for 3D Object Detection", Apr. 12, 2020 (10 pages).
Velzhev et al.—"Implicit Shape Models for Object Detection in 3D Point Clouds", ISPRS Annals of the Photogrammetry, Remote Sensing and Spatial Information Sciences, vol. 1-3, 2012 XXII ISPRS Congress, Aug. 25-Sep. 1, 2012, Melbourne, Australia (6 pages).
Tombari et al.—"Hough Voting for 3D Object Recognition under Occlusion and Clutter", IPSJ Transactions on Computer Vision and Applications, vol. 4, Mar. 20-29, 2012, Information Processing Society of Japan (10 pages).
Spezialetti et al.—"Learning an Effective Equivariant 3D Descriptor Without Supervision", ICCV, Sep. 15, 2019 (10 pages).
Rumelhart et al—"Learning Internal Representations by Error Propagation, Parallel distributed processing: explorations in the microstructure of cognition", vol. 1, foundations, MIT Press, Cambridge, MA 1986, Basic Mechanisms, Chapter 8 (23 pages).
Qi et al.—"Deep Hough Voting for 3D Object Dection in Point Clouds", Aug. 22, 2019 (14 pages).
Mian et al.—"On the Repeatability and Quality of Keypoints for Local Feature-based 3D Object Retrieval from Cluttered Scenes", Int. J. Comput Vis. (2010), 89, (14 pages).
Landrieu et al.—"Large-scale Point Cloud Semantic Segmentation with Superpoint Graphs", Mar. 28, 2018 (12 pages).
Landrieu et al.—"Cut Pursuit: fast algorithms to learn piecewise constant functions on general weighted graphs", SIAM Journal on Imaging Sciences, HAL Id:hal-01306779 https://halarchives-ouvertesfr/hal-01306779v4, submitted Aug. 21, 2017 (45 pages).
Qi et al.—"P2B: Point-to-Box Network for 3D Object Tracking in Point Clouds", May 28, 2020 (10 pages).
Hackel et al.—"semantic3d.net: a New Large-Scale Point Cloud Classification Benchmark", ISPRS, Apr. 12, 2017 (9 pages).
Guinard et al.—"Weakly Supervised Segmentation-Aided Classification of Urban Scenes From 3D Lidar Point Clouds", The International Archives of the Photogrammetry, Remote Sensing and Spatial Information Sciences, vol. XLII-1/Wi, 2017 ISPRS Hannover Workshop: HRIGI 17-CMRT 17-ISA 17-EuroCOW 17, Jun. 6-9, 2017, Hannover, Germany (7 pages).
Geiger et al.—"Are we ready for Autonomous Driving the KITTI Vision Benchmark Suite", CVPR 2012, (8 pages).
Elberink et al—"User-Assisted Object Detection by Segment Based Similarity Measures in Mobile Laser Scanner Data", The International Archives of the Photogrammetry, Remote Sensing and Spatial Information Sciences, vol. XL-3, 2014 ISPRS Technical Commission III Symposium, Sep. 5-7, 2014, Zurich, Switzerland (8 pages).
Demantké et al.—"Dimensionality Based Scale Selection in 3D Lidar Point Clouds" International Archives of the Photogrammetry, Remote Sensing and Spatial Information Sciences, 2011,(6 pages).
Armeni et al.—"3D Semantic Parsing of Large-Scale Indoor Spaces", CVPR 2016, http://buildingparser.stanford.edu (10 pages).
Bellekens et al.—"A Benchmark Survey of Rigid 3D Point Cloud Registration Algorithms" International Journal on Advances in Intelligent Systems, vol. 8, No. 1&2, 2015, http://wwwiariajournals.org/intelligent_systems/ (10 pages).
Search Report dated Jun. 7, 2021 issued in corresponding European patent application No. 20306588.3 (10 pages).
Office Action dated Aug. 19, 2025, issued in counterpart JP Application No. 2021-203671, w/English Translation, (14 pages).

* cited by examiner

MACHINE-LEARNING FOR 3D OBJECT DETECTION

CROSS-REFERENCE TO RELATED APPLICATIONS

This application claims priority under 35 U.S.C. § 119 or 365 to European Application No. 20306588.3, filed Dec. 16, 2020. The entire contents of the above application(s) are incorporated herein by reference.

FIELD

The disclosure relates to the field of computer programs and systems, and more specifically to a method, system and program for machine-learning for 3D object detection.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, machine-learning and 3D object detection are gaining wide importance.

There is however still a need for an improved method of machine-learning for 3D object detection.

SUMMARY

It is therefore provided a computer-implemented method of machine-learning, for learning a neural network configured for encoding a super-point of a 3D point cloud into a latent vector. The method comprises providing a dataset of super-points. Each super-point is a set of points of a 3D point cloud. The set of points represents at least a part of an object. The method further comprises learning the neural network based on the dataset of super-points. The learning comprises minimizing a loss. The loss penalizes a disparity between two super-points.

The method may comprise one or more of the following:
the loss is a reconstruction loss, the loss penalizing a disparity between a super-point and a reconstruction of the super-point;
the disparity is a distance between the super-point and the reconstruction of the super-point;
the distance is the Chamfer distance or the Earth-Mover distance; and/or;
the learning is an unsupervised learning.

It is further provided a neural network learnable according to the method.

It is further provided a computer-implemented method of use of the neural network. The method of use comprises providing one or more first super-points of a first 3D point cloud. The first 3D point cloud represents a 3D scene. The method of use further comprises providing one or more second super-points of a second 3D point cloud. The second 3D point cloud represents a 3D object. The method of use further comprises, by applying the neural network, encoding the one or more first super-points each into a respective first latent vector and the one or more second super-points each into a respective second latent vector. The method of use further comprises determining a similarity between each first super-point of one or more first super-points and each second super-point of one or more second super-points, by, for said each first super-point and said each second super-point, computing a similarity measure between the respective first latent vector encoding the first super-point and the respective second latent vector encoding the second super-point.

The method of use may comprise one or more of the following:
the providing of the one or more first super-points comprises:
  providing one or more initial super-points of the first 3D point cloud;
  filtering the one or more initial super-points by selecting, among the initial super-points, each initial super-points for which:
    a disparity between dimensions of the super-point and dimensions of at least one second super-point is smaller than a predefined threshold; and/or
    a disparity between a position of the super-point and a position of at least one second super-point is smaller than a predefined threshold,
  the selected super-points being the one or more first super-points;
the filtering comprises selecting, among the initial super-points, each initial super-points for which:
  a distance between each dimension of the super-point and a corresponding dimension of at least one second super-point is smaller than a predefined threshold; and/or
  a ratio between each dimension of the super-point and a corresponding dimension of at least one second super-point is smaller than a maximal ratio and larger than a minimal ratio; and/or
  a difference between a relative height from a closest support surface of the super-point and a relative height from a closest support surface of at least one second super-point is smaller than a predefined threshold;
the method further comprises determining, among first super-points each having a determined similarity with at least one second super-point that is larger than a predefined threshold, one or more groups of first super-points, each group of first super-points having a similar shape than the second 3D point cloud;

the determining of the one or more groups comprises:
  providing a graph of second super-points, the graph of second super-points having nodes each representing a second super-point and edges each representing a geometrical relation between the two super-points represented by the nodes connected by the edges and having one or more geometrical attributes of the geometrical relation;
  forming one or more graphs each having nodes representing each a first super-point, by constructing edges each connecting two nodes and each having one or more geometrical attributes similar to geometrical attributes of an edge of the graph of second super-points, each formed graph corresponding to a respective group; and/or
  the method further comprises, for each group, determining a similarity score by measuring a similarity of the first super-points in the group with the one or more second super-points.

It is further provided a computer program comprising instructions for performing the method and/or the method of use.

It is further provided a device comprising a data storage medium having recorded thereon the computer program and/or the neural network.

The device may form or serve as a non-transitory computer-readable medium, for example on a SaaS (Software as a service) or other server, or a cloud based platform, or the like. The device may alternatively comprise a processor coupled to the data storage medium. The device may thus form a computer system in whole or in part (e.g., the device is a subsystem of the overall system). The system may further comprise a graphical user interface coupled to the processor.

BRIEF DESCRIPTION OF THE DRAWINGS

Embodiments will now be described, by way of non-limiting example, and in reference to the accompanying drawings, where.

DETAILED DESCRIPTION

Figure 1:
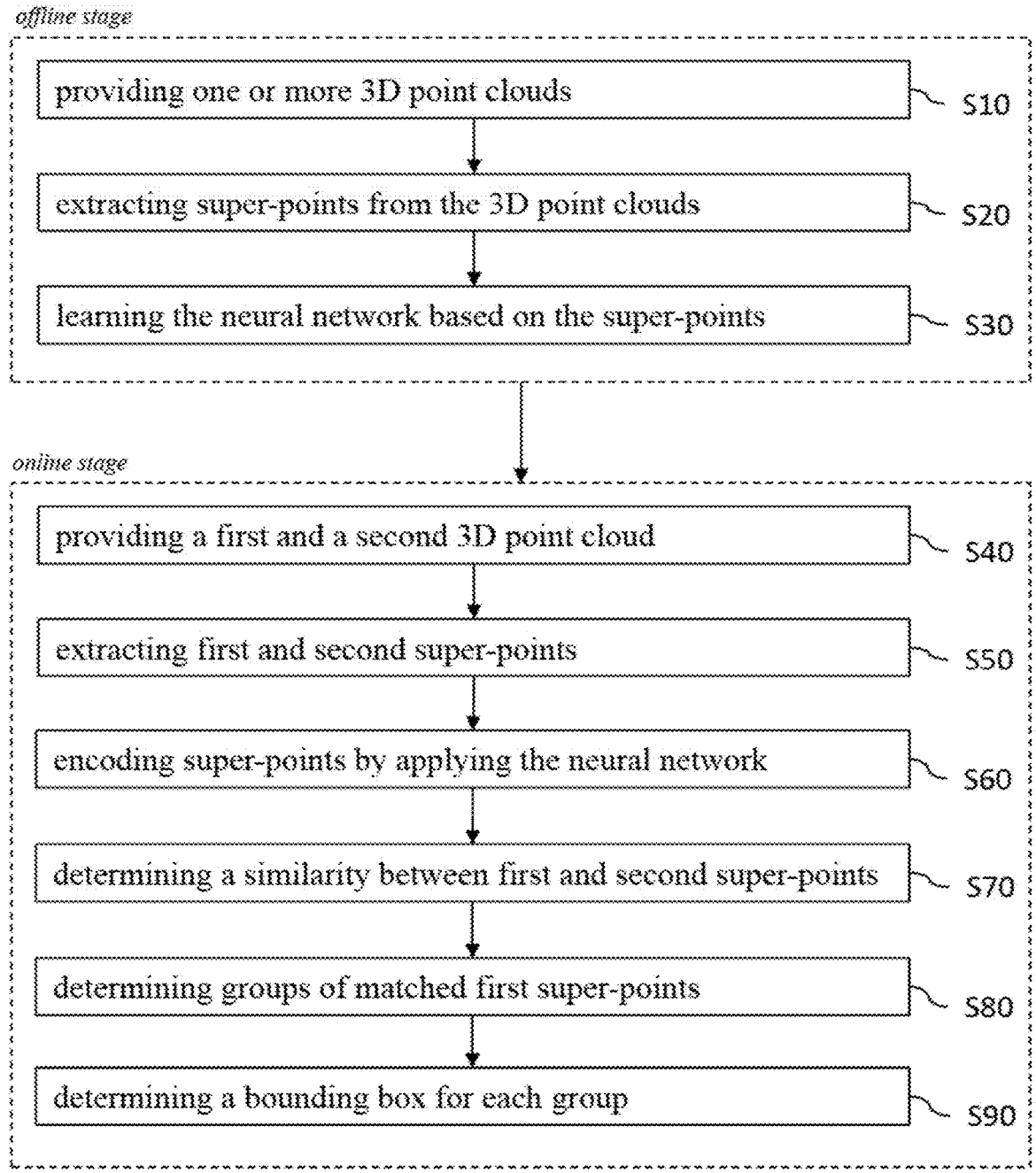
FIG. 1 shows a flowchart of an example of a process integrating the methods.

It is proposed a computer-implemented method of machine-learning, for learning a neural network configured for encoding a super-point of a 3D point cloud into a latent vector. The method comprises providing a dataset of super-points. Each super-point is a set of points of a 3D point cloud. The set of points represents at least a part of an object. The method further comprises learning the neural network based on the dataset of super-points. The learning comprises minimizing a loss. The loss penalizes a disparity between two super-points. The method may be referred to as "the learning method".

The learning method forms an improved method of a machine-learning for 3D object detection.

Notably, the learning method enables 3D object detection in a 3D point cloud. The neural network learnt by the learning method can notably be used in many applications that use 3D object detection, such as any application that uses the 3D object detection according to the method of use which will be discussed hereinafter. The Application may be (e.g., automatically) doing asset inventory and/or management (e.g., in a plant scene, localizing all the robots to move or replace them or some of them), (e.g., automatic) object removal and/or replacement (e.g., in a plant scene, replacing automatically all the scans of similar machines), and/or virtual twin (e.g., of a plant scene) generation. A virtual plant twin consists in a CAD scene or a mixture of CAD scenes and 3D point clouds, the virtual plant representing for example a twin of a scanned or the physical real plant. Ultimately, the virtual twin generation of a plant scene may allow to perform simulations of the plant and/or various optimizations of the plant.

Furthermore, the learning method learns a neural network capable of taking as input a super-point of a 3D point cloud and of encoding the super-point into a latent vector. In other words, the learning method learns a neural network capable of projecting any 3D super-point of a 3D point cloud into a latent representation. Since the neural network is trained/learnt by minimizing a loss penalizing a disparity between two super-points, the neural network encodes an input super-point into a latent vector which is a meaningful representation of the super-point in terms of geometrical information.

Indeed, the loss takes as input two super-points and computes a disparity between them, and since the loss penalizes the disparity, the loss tends to have a large value as the disparity is high. Thereby, during the learning, for each super-point used as a training sample, the super-point is fed as input to the loss, and another super-point is also fed as input to the loss, the other super-point being obtained from a latent vector encoding the super-point which is a training sample (i.e., the latent vector resulting from the application of the neural network to the super-point). In other words, the loss penalizes a disparity between the super-point which is a training sample and the other super-point. The other super-point may for example be a reconstruction of the super-point which is a training sample by decoding the latent vector encoding this super-point, the neural network comprising in this case an encoder for encoding super-points into latent vectors and a decoder for decoding latent vectors into super-points, as further discussed hereinafter. This is for example the case when the neural network is an autoencoder. Then, the learning computes the loss value for the super-point which is a training sample and the other super-point, the loss taking as input a couple of super-points. This value of the loss quantifies a geometrical disparity between the super-points taken as input by the loss, here the super-point which is a training sample and the other super-point. The geometrical disparity is thereby a disparity between the super-point which is a training sample and a decoding of its encoding latent vector. Since the loss penalizes such a disparity, the value is large when the disparity is large. Since the learning minimizes the loss, the learning modifies the weights of the neural network when the value is large, as the large value captures the fact that the encoding of super-point which is a training sample is not satisfying enough. In other words, the latent vector encoding the super-point which is a training sample does not capture sufficiently accurately the geometry of this super-point when the value is high, so that the weights need being modified to improve this accuracy.

The learning according to the learning method thereby tends to ensure that super-points having similar geometries will be encoded with similar latent vectors, and that two super-points having different geometries will be encoded with substantially distinct latent vectors. In yet other words, the neural network is trained to project a super-point into a latent representation that presents meaningful geometrical information, the learning aims for a distance between latent vectors encoding two super-points to be highly correlated to the geometrical similarity of those two super-points. Now, since a super-point of a 3D point loud is a subset of points of the 3D point cloud describing a local part of the 3D point cloud (e.g., a local shape, forming at least a part of an object in the 3D point cloud), the neural network learnt by the learning method allows to encode local parts of a 3D point cloud into geometrically meaningful latent vector representations.

The neural network is thus a neural network that can be used to perform 3D object detection in a 3D point cloud. The learning method is thus a method of machine-learning for 3D object detection. For example, given a first 3D point cloud comprising one or more first super-points and a second 3D point cloud comprising one or more second super-points, the neural network can encode the super-points into latent vectors, which can then be used to compute a similarity measure between the latent vectors. This allows to determine which first super-points are geometrically similar to second super-points, which allows to detect in the first point cloud local shapes which are similar to local shapes of the 3D object represented by the second point cloud. Ultimately, these similar local shapes can be used/processed to output 3D objects (i.e., formed by one or more detected local shapes) in the first 3D point cloud that are similar to the 3D object represented by the second 3D point cloud. For example, if the first 3D point cloud represents a plant/factory, and the second 3D point cloud represents a 3D articulated robot, the neural network can be used to detect (e.g., all the) 3D articulated robots in the plant that are similar to the 3D articulated robot represented by the second 3D point cloud. Furthermore, because of the learning operated by the learning method, the detection is generic: the neural network does not only detect exact instances of the second 3D point cloud in the first 3D point cloud, but also detects objects in the first 3D point cloud that are partially similar to the object represented by the second 3D point cloud. In other words, given a single 3D object represented by a 3D point cloud, the neural network enables localization of partially similar 3D objects in a bigger 3D point cloud (e.g., a 3D point cloud with 20 times more points), for example geometrical transformations (e.g., rotations or changes of position) of instances of said single 3D object, occlusions of instances of said single 3D object, and other types of 3D objects which geometrically resemble said single 3D object.

Furthermore, the learning does not require any labelling of the training dataset. For example, the learning may be an unsupervised learning, as known per se in the field of machine-learning. This allows the learnt neural network to be agnostic to the class/type of the 3D object to detect and to be agnostic to the context/background of the detection (e.g., whether the object(s) to detect is/are in an indoor scene or an outdoor scene). For example, once trained, the neural network may be used to detect any objects in any context, such as objects unseen during the learning and/or in contexts unseen during the learning. Moreover, the neural network is agnostic to the type of point cloud from to which the input super-points belong (i.e., no constraint is required on point cloud acquisition for the detection to work). Altogether, this makes the neural network generic and particularly robust for use for 3D object detection in a 3D point cloud. The neural network may for example be trained based on synthetic point clouds and then used to perform 3D object detection on measured 3D point clouds, i.e., 3D point clouds acquired by physical sensors.

Moreover, the use of local learning-based representation (i.e., the learning trains the neural network to encode super-points representing local shapes) makes the neural network also robust to noise, occlusions, and point distributions, and also invariant to different types of transformations (e.g., rotations) and object positions (e.g., articulated objects such as articulated robots featuring articulated robotic arms). This makes the neural network even more robust for use for 3D object detection in a 3D point cloud. Notably, the neural network may be used to detect objects in a 3D point cloud which are partially similar to (i.e., which are not exact instances of) a given 3D object (i.e., a query, as discussed hereinafter). Moreover, the neural network does not rely on colors of the objects to detect them: the neural network detects similar shapes even if they have different colors.

It is also provided a neural network learnable according to the learning method, for example a neural network having been learnt by the learning method. The neural network forms a computerized data structure having layers of neurons with weights (also referred to as parameters) of which values are settable have been set) by the learning according to the learning method.

It is also provided a computer-implemented method of use of the neural network. The method of use comprises providing one or more first super-points of a first 3D point cloud. The first 3D point cloud represents a 3D scene. The method of use further comprises providing one or more second super-points of a second 3D point cloud. The second 3D point cloud represents a 3D object. The method of use further comprises, by applying the neural network, encoding the one or more first super-points each into a respective first latent vector and the one or more second super-points each into a respective second latent vector. The method of use further comprises determining a similarity between each first super-point of one or more first super-points and each second super-point of one or more second super-points, by, for said each first super-point and said each second super-point, computing a similarity measure between the respective first latent vector encoding the first super-point and the respective second latent vector encoding the second super-point. The method of use may be referred to as "the detection method".

The detection method is a method for 3D object detection in a 3D point cloud. The detection method forms an improved method for 3D object detection in a 3D point cloud. Indeed, the method of use allows to detect the first super-points of the first 3D point cloud, which represents a 3D scene, that are geometrically similar to second super-points of the second 3D point cloud, which represents a 3D object. In other words, the second super-points each represent a local part of the object, and the detection method detects the local parts of the first point cloud (i.e., first super-points) that are geometrically similar to these local parts of the object. This allows to detect, in the 3D scene represented by the first 3D point cloud, 3D objects which are similar to the one represented by the second 3D point cloud.

For detecting similar 3D objects, the detection method uses the neural network to encode the super-points into latent vectors and then determines a similarity measure between encoded super-points. Thereby, the detection method benefits from the robustness of the neural network, which projects an input super-point onto a latent representation that is geometrically meaningful, as previously explained. The determining of a similarity between two super-points is accurate as it computes a similarity measure between the latent vectors encoding the two super-points, the latent vectors being geometrically meaningful representations of the two super-points as previously discussed. In other words, if a similarity is detected between the latent vectors, then it means that there is a corresponding geometrical similarity between the two super-points. The detection method thereby allows a robust detection of similar 3D objects in a 3D point cloud.

The learning method and the detection method may be performed independently, e.g., by different users and/or on different computers. Alternatively, they may be integrated into a same computer-implemented process. The process is now discussed with reference to FIG. 1, which shows a flowchart of an example of the process.

The process comprises an offline stage, the offline stage integrating the learning method. The offline stage comprises the providing S10-S20 of the dataset of super points according to the learning method. The offline stage further comprises the learning S20 of the neural network based on the super-points according to the learning method. The offline stage may further comprise storing the learnt neural network on a memory.

The process also comprises an online stage, the online stage integrating the detection method. The online stage comprises the providing S40-S50 of the one or more first super-points and of the one or more second super-points according to the detection method. Prior to that, the online stage may comprise providing the learnt neural network, e.g., by retrieving it from a memory where the learnt neural network has been stored after having been learnt at the offline stage. The online stage further comprises the encoding S60 of the first and second super-points according to the detection method. The online stage further comprises the determining S70 of a similarity between one or more first super-points and one or more second super-points according to the detection method.

The learning method is now further discussed.

The learning method is a method of machine-learning for 3D object detection in a point cloud.

As known per se, a 3D point cloud is an unordered set of 3D points with coordinates (usually in 3D) that can optionally be accompanied with additional characteristics (e.g., encapsulated in additional coordinates) such as intensity or color. The unordered aspect of this data makes it hard to analyze, especially compared to structured grid such as images. Different formats of 3D point clouds exist, for example depending on the sensor used to capture the 3D scan yielding a 3D point cloud, but the neural network is agnostic to these different formats, as previously discussed. Nowadays, state-of-the art sensors can provide 3D point clouds of millions of points giving very dense 3D scans of very high quality. Any 3D point cloud herein may stem from such a dense 3D scan. Point clouds can be also generated from other 3D representations such as CAD objects or meshes. Any 3D point cloud herein may stem from such generation. This is further discussed hereinafter.

3D object detection in a 3D point cloud corresponds to the task of detecting/localizing a particular 3D shape or 3D object in a 3D scene. The detection may use 3D bounding boxes, for example by drawing a 3D bounding box around each detected object for indicating that detection has occurred. In the context of the present disclosure, a 3D shape can be a 3D object or only a part thereof. The detection detects one or more shapes each similar to an input shape.

In the context of the present disclosure, the similarity between 3D objects consists in both global and local geometric similarity As known per se, a 3D point cloud is a set of 3D points, e.g., each described by three cartesian coordinates in the 3D space. This amounts to say that each point cloud herein may be associated to a set of triplets each representing the 3D coordinates of a point of the 3D point cloud. Any 3D point cloud herein may represent a 3D real scene, a real scene being a piece of the real world (e.g., a plant scene or an office scene), each point of the 3D point cloud representing a point of the scene. "Representing a real scene" does not necessarily mean that the 3D point cloud stems from physical measurements performed in the real world. For example, any 3D point cloud herein may be a synthetic representation of a real scene, as further discussed hereinafter. Any 3D point cloud herein may represent or comprise a 3D object or may comprise several 3D objects. Each object of the 3D point cloud is herein a set of points of the 3D point cloud which each represent a point of the 3D object as it is in the real world, the set of points forming altogether a representation of the 3D object of the real world.

Any 3D point cloud herein may be a synthetic point cloud, i.e., a point cloud that stems from a synthetic 3D point cloud generation process. In other words, a synthetic point cloud representing a real scene does not stem from physical measurements performed on a real scene to capture a representation of it, but forms a virtual, numerically generated, representation of the real scene. The synthetic point cloud generation process designates any computer-implemented process that outputs synthetic 3D point clouds. The generation process may for example generate 3D point clouds from any other 3D geometric representation such as a CAD model or a 3D mesh. The generation process may for example be that of reference Xiangyu Yue et. al., "A LiDAR Point Cloud Generator: from a Virtual World to Autonomous Driving", 2018 which is incorporated herein by reference and which proposes virtual scanner simulation to extract point clouds from 3D CAD scenes (e.g., video-game environments).

Alternatively, any 3D point cloud herein may be stem from physical measurements on a real scene. Providing such a 3D point cloud may comprise providing one or more physical sensors (e.g., fixed or mobile 3D scans, such as fixed or mobile LIDARS) each configured for acquiring a respective physical signal and acquiring the one or more respective physical signals by operating the one or more physical sensors on the real (i.e., scanning the real scene with each sensor). The providing of the 3D point cloud may then comprise automatically determining a 3D point cloud based on the measurements, according to any known technique. Note that, state-of-the art sensors are able to provide clouds of millions of points giving very dense 3D scans of very high quality. Any 3D point cloud herein may be acquired by such sensors, such as 3D scanners (e.g., LIDAR), which are widely used to collect a 3D point cloud representation of real environment. Several point cloud datasets are now publicly available for outdoor contexts, such datasets being for example discussed in references Timo Hackel et. al., "*SEMANTIC3D.NET: A new large-scale point cloud classification benchmark*", ISPRS 2017, and Andreas Geiger et. al., "*Are we ready for Autonomous Driving? The KITTI Vision Benchmark Suite*", CVPR 2012, which are both incorporated herein by reference, as well as for indoor contexts, as discussed for example in reference Iro Armeni et. al, "3D *Semantic Parsing of Large-Scale*

*Indoor Spaces*", CVPR 2016, which is incorporated herein by reference. Any 3D point cloud herein may be taken from any one of these datasets.

Any 3D point cloud herein may comprise more than 10000, 100000, 1000000, 10000000 or 100000000 points. For example, a 3D point cloud representing a scene (e.g., a plant/factory scene) may comprise more than 10000000 or 100000000 points. Any 3D point cloud representing a 3D object may comprise about 20 times less points.

Any 3D point cloud herein may represent a manufacturing scene, e.g., the inside (or a portion thereof) of a plant/factory. Such a scene may comprise objects of the manufacturing world, which are represented by portions/parts of the 3D point cloud. Any 3D point cloud herein may also simply represent such an object. Such an object may be a (e.g., mechanical) part or assembly of parts (or equivalently an assembly of parts, as the assembly of parts may be seen as a part itself), or more generally any rigid body assembly (e.g., a mobile mechanism). The object may belong to various industrial fields: aerospace, architecture, construction, consumer goods, high-tech devices, industrial equipment, transportation, marine, and/or offshore oil/gas production or transportation. The object may thus represent an industrial product which may be any mechanical part, such as a part of a terrestrial vehicle (including e.g., car and light truck equipment, racing cars, motorcycles, truck and motor equipment, trucks and buses, trains), a part of an aerial vehicle (including e.g., airframe equipment, aerospace equipment, propulsion equipment, defense products, airline equipment, space equipment), a part of a naval vehicle (including e.g., navy equipment, commercial ships, offshore equipment, yachts and workboats, marine equipment), a general mechanical part (including e.g., industrial manufacturing machinery, heavy mobile machinery or equipment, installed equipment, industrial equipment product, fabricated metal product, tire manufacturing product), an electro-mechanical or electronic part (including e.g., consumer electronics, security and/or control and/or instrumentation products, computing and communication equipment, semi-conductors, medical devices and equipment), a consumer good (including e.g., furniture, home and garden products, leisure goods, fashion products, hard goods retailers' products, soft goods retailers' products), a packaging (including e.g., food and beverage and tobacco, beauty and personal care, household product packaging). The object may also be a manufacturing tool, such as an articulated manufacturing robot.

The learning method is for machine learning.

As known per se from the field of machine-learning, the processing of an input by a neural network includes applying operations to the input, the operations being defined by data including weight values. Learning a neural network thus includes determining values of the weights based on a dataset configured for such learning, such a dataset being possibly referred to as a learning dataset or a training dataset. For that, the dataset includes data pieces each forming a respective training sample. The training samples represent the diversity of the situations where the neural network is to be used after being learnt. Any training dataset herein may comprise a number of training samples higher than 1000, 10000, 100000, or 1000000. In the context of the present disclosure, by "learning a neural network based on a dataset", it is meant that the dataset is a learning/training dataset of the neural network, based on which the values of the weights (also referred to as "parameters").

The neural network involved in the methods may be a Deep Neural Network (DNN). DNNs are a powerful set of techniques for learning in Neural Networks, as discussed for example in D. E. Rumelhart et. al, "*Learning internal representations by error propagation, Parallel distributed processing: explorations in the microstructure of cognition*", vol. 1: foundations, MIT Press, Cambridge, MA, 1986, which is incorporated herein by reference. DNN is a biologically-inspired programming paradigm enabling a computer to learn from observational data. DNNs have an ability to learn rich midlevel media representations as opposed to hand-designed low-level features (Zernike moments, HOG, Bag-of-Words, or SIFT) used in other methods (min-cut, SVM, Boosting, or Random Forest). Thereby using a DNN is particularly relevant for object detection/recognition. More specifically, DNNs are focused on end-to-end learning based on raw data. In other words, they move away from feature engineering to a maximal extent possible, for example by accomplishing an end-to-end optimization starting with raw features and ending in labels.

In the context of the learning method, the training dataset of the neural network is the provided dataset of super points, each super-point forming a training sample of the training dataset. The training dataset consists of super-points which are each a set of points of a 3D point cloud. The super-points may stem from one or more 3D point clouds, i.e., each point cloud comprising one or more of the super-points. A super-point of a 3D point cloud is a set of points in the 3D point cloud, the set of points representing a shape, i.e., at least a part of a 3D object, e.g., the whole object or a local shape thereof. The concept of super-point is well known. The providing S10-S20 of the super-points may comprise providing the super-points as such, e.g., already computed. Alternatively, the providing S10-S20 of the super-points may comprise providing S10 one or more 3D point clouds and extracting S20 the super-points from the provided 3D point clouds.

Providing S10 the one or more 3D point clouds may comprise retrieving the 3D point clouds from a memory. Alternatively, providing S10 the one or more 3D point clouds may comprise obtaining at least some of (e.g., all) the one or more 3D point clouds. Obtaining a 3D point cloud may comprise executing a synthetic 3D point cloud generation process, in which case the obtained 3D point cloud is a synthetic 3D point cloud as previously discussed. The generation process may for example generate the 3D point cloud from a CAD scene. Obtaining a 3D point cloud may alternatively comprise performing a physical acquisition of the 3D point cloud by operating one or more physical sensors (e.g., one or more LIDAR) on a real scene (e.g., the inside of a plant/factory), as previously discussed. The provided 3D point clouds may thus consist of only synthetic 3D point clouds, only physically acquired 3D point clouds, or a mix of synthetic 3D point clouds and physically acquired 3D point clouds.

Extracting S20 the super-points from the provided 3D point clouds comprises, for each provided 3D point cloud, extracting one or more super-points from the 3D point cloud. Extracting super-points from the 3D point cloud may be carried out by any known method of extracting super-points from a 3D point cloud, such methods being well known. The method for extracting the super-points from a 3D point cloud may be a distance-based extraction, in which neighborhoods of points are considered (within a radius or given by K-Nearest Neighbors), as known in the art. The method for extracting the super-points may alternatively be a geometry-based extraction, for which the point cloud is divided in geometrically homogenous super-points, as known in the art.

The method for extracting the super-points may for example be the distance-based method given in reference G. Elbaz et al., "*3D Point Cloud Registration for Localization using a Deep Neural Network Auto-Encoder*" CVPR 2017, which is incorporated herein by reference. This method may be referred to as the RSCS (Random Sphere Cover Set) method. This method allows to extract super-points as basic matching units for a registration problem. More specifically, this method consists in an iterative procedure comprising, given a predefined. Radius $R_{sphere}$, at each iteration, randomly selecting a point P that does not yet belong to any super-point SP, and then, defining a new SP as the set of points located inside the sphere of a radius $R_{sphere}$ with P as its center. Super-point overlapping is allowed, i.e., one point can be included in several super-points.

Figure 2:
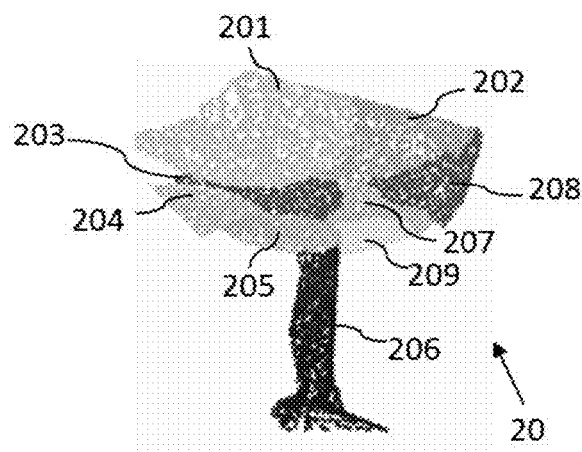
FIGS. 2, 3, 4, 5, 6, 7, 8, 9, 10, 11, 12, 13, 14, 15, 16, 17, and 18 illustrate the methods.

FIG. 2 shows a super-point extraction from a 3D point cloud 20 using the RSCS method (with a radius equal to 0.3 m). Super-points 201 to 209 have been extracted.

The method for extracting the super-points may alternatively be the geometry-based method given in reference L. Landrieu et. al, "*Cut pursuit: Fast algorithms to learn piecewise constant functions on general weighted graphs*", SIAM Journal on Imaging. Sciences, 2017, which is incorporated herein by reference. This method allows to extract super-points for a semantic segmentation problem. This method considers geometric features such as linearity, planarity, scattering (also discussed in reference J. Demantk et. al., "*Dimensionality based scale selection in* 3D *lidar point clouds*". International Archives of the Photogrammetry, Remote Sensing and Spatial Information Sciences, 2011, which is incorporated herein by reference) and verticality (also discussed in reference S. Guinard et. al., "*Weakly supervised segmentation-aided classification of urban scenes from* 3d *LiDAR point clouds*", ISPRS 2017, which is incorporated herein by reference), to distinguish between super-points. Such features describe the local neighborhood of each point based on their K nearest neighbors. Then the method comprises building a nearest neighbor's adjacency graph, as discussed in reference Guinard et. al., "*Weakly supervised segmentation-aided classification of urban scenes from* 3d *LiDAR point clouds*", ISPRS 2017, which is incorporated herein by reference. The method performs a minimal partition over the geometric features on the graph with a cut pursuit algorithm, as discussed in reference L. Landrieu et. al, "*Cut pursuit: Fast algorithms to learn piecewise constant functions on general weighted graphs*", SIAM Journal on Imaging Sciences, 2017, which is incorporated herein by reference. This algorithm contains a regularization weight that controls the coarseness of the partition. The method disclosed in previously-cited reference Guinard et. al., "*Weakly supervised segmentation-aided classification of urban scenes from* 3d *LIDAR point clouds*", ISPRS 2017, may compute the linearity, planarity and scattering values by first computing a PCA (Principal Component. Analysis) on the neighborhood of each point. Then this method may compute the eigenvalues of the covariance matrix of the points' positions and may use them to evaluate the normals by estimating the surface, or to derive other meaningful vectors.

Figure 3:
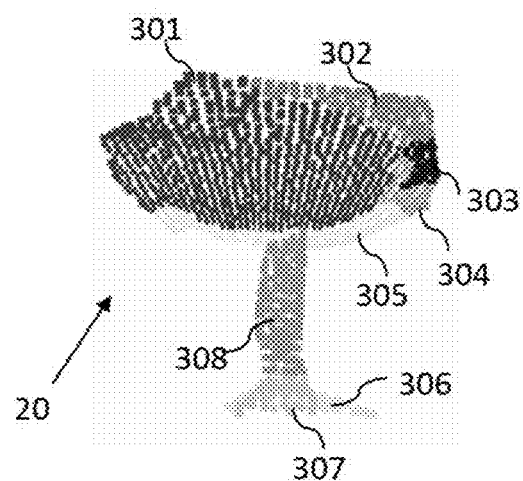

FIG. 3 shows a super-point extraction from the 3D point cloud 20 already shown on FIG. 2 using the currently discussed geometry-based method (with a regularization weight equal to 0.1 m). Super-points 301 to 308 have been extracted.

Figure 4:
Figure 5:
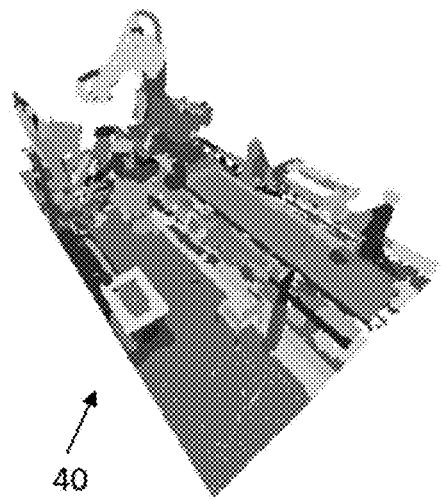

FIGS. 4 and 5 illustrate a comparison between super-points obtained from a same point cloud but with different methods. FIG. 4 shows super-points obtained from point cloud 40 with a distance-based method and FIG. 5 shows super-points obtained from the same point cloud 40 but with a geometric-based method.

Figures 6, 7, 8:
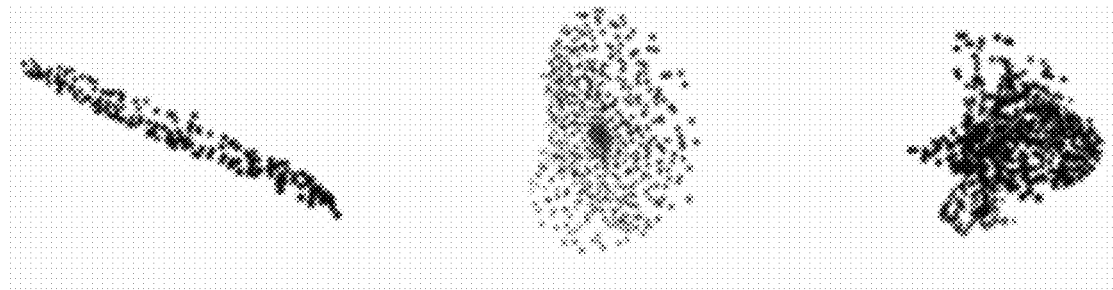

The linearity value may be given by the formula $(\lambda_1-\lambda_2)/\lambda_1$, the planarity value may be given by the formula $(\lambda_1-\lambda_3)/\lambda_1$, and the scattering value may be given by the formula $\lambda_3/\lambda_1$, where $\lambda_1$, $\lambda_2$, and $\lambda_3$ are the eigenvalues of the covariance matrix of the points' positions. FIG. 6 illustrates the linearity value of a point of a 3D point cloud, FIG. 7 illustrates the planarity value, and FIG. 8 illustrates the scattering value.

The method may use a geometric-based method for super-point extraction, for example the one discussed above, to benefit from the advantages of this type of method. The fact that, with such a method, a super-point tends to correspond to only one uniform part of the point cloud (due to the cut obtained in the adjacency graph) makes it more convenient for further processing: thereby a super-point tends to be a part of a single object, depending on the regularization weight of the cut. This offers interesting properties. For example, the super-point extraction tends to be consistent between the super-points extracted from an isolated point cloud object and the same object (or similar ones) in a scene, i.e., with other objects. Also, a super point obtained with such a method regroups points with similar geometrical properties, thus simplifying the complexity needed for the learning step.

The learning S30 of the neural network is now discussed.

The learnt neural network is a neural network configured to take as input a super-point and to encode it into a latent vector, i.e., a vector of dimension lower than the dimension of the super-point but forming a geometrically meaningful latent encoding of the super-point. The neural network is learnt to do so, i.e., the weights of the neural network are modified during the learning until the neural network performs this task sufficiently well. The neural network may comprise an encoder, which is a neural network configured for taking as input a super-point and to project it onto a latent vector space. The encoder is in other words trained to compress the input super-point while tending to keep its properties. The learning of the encoder, by using the loss, leads to the projection into a latent representation that is meaningful in terms of geometrical properties. For example, the learning, by using the loss, is such that there is a correlation between the similarity between two super-points and the similarity of their encoding. The neural network may be or may comprise any neural network that takes as input a super-point (or, more generally, a 3D point cloud) and that projects it in a lower dimension space while being invariant to object transformations such as rotations. For example, the neural network architecture may be that disclosed in R. Spezialetti et. al., "*Learning an Effective Equivariant* 3D *Descriptor Without Supervision*", ICCV 2019, which is incorporated herein by reference.

The learning S30 of the neural network may also comprise learning, e.g., simultaneously with the learning of the encoder, a decoder, which is a neural network configured to take as input a latent vector and to decode it into a super-point. In other words, the decoder performs a reconstruction of a super-point (e.g., as encoded by the encoder) based on an input latent vector. The neural network learnt by the method may thus consist in an encoder, configured to take as input an input super-point and to encode it into a latent vector, and a decoder, configured to take as input a latent vector and to decode it into a super-point.

For example, the neural network may be an autoencoder comprising the encoder and the decoder. The autoencoder architecture is well known from the field of machine-learning and is for example discussed in reference G. Elbaz et. al. "*3D Point Cloud Registration for Localization using a Deep Neural Network Auto-Encoder*", CVPR 2017, which is incorporated herein by reference. As known per se from the field of machine-learning, an autoencoder compresses the information of its input (i.e., a super-point for the autoencoder of the present disclosure). More specifically, the autoencoder is trained to project the input, here an input super-point, into a latent representation (e.g., several times smaller than the input size) and to reconstruct the input from this representation. The autoencoder compresses the information while trying to keep all the properties of the input super-point for several different super-points. The learning of the autoencoder thereby implicitly leads to the projection into a latent representation that is meaningful in terms of geometrical properties. For example, the learning is such that there is a correlation between the similarity between two super-points and the similarity of their encoding.

The learning S30 comprises minimizing a loss. The loss penalizes a disparity between two super-points. In other words, the loss takes as input two super-points and computes a disparity between them, i.e., a quantification of their geometrical disparity. The more the super-points are geometrically dissimilar, the larger the value of the loss for these super-points is. The learning S30 uses the loss to measure whether an input super-point of the training dataset is encoded accurately enough by a latent vector when applying the neural network to the input super-point. Specifically, the learning S30 may comprise iterations of the following:

selecting a super-point of the training dataset;
  encoding the super-point into a latent vector by applying the neural network, or an encoder of the neural network;
  obtaining another super-point from the latent vector, e.g., by reconstructing the other super-point from the latent vector, e.g., by decoding the latent vector into the other super-point, e.g., by applying a decoder of the neural network to the latent vector;
  computing a value of the loss for the super-point and the other super-point by feeding the super-point and the other super-point as inputs to the loss;
  assessing whether the computed value is too high, i.e., by assessing whether the computed value is higher than a predefined threshold (e.g., a convergence threshold). A high value of the loss captures the fact that the latent vector does not encode the super-point with a sufficient accuracy yet, i.e., the latent vector is not yet geometrically meaningful enough as a latent representation of the super-point;
  if the computed value is too high, modifying the weights of the neural network, e.g., by modifying the weights of the encoder and/or of the decoder.

The above steps may be repeated as long as a convergence criterion (as known per se in the field of machine-learning) of the learning S30 has not been reached and/or as long as a sufficient (i.e., large enough) number of super-points of the dataset has not been selected. The selection of super-points during the iterations may be such that each super-point of the dataset is selected at least once. Any known learning strategy may be used for the selection.

The loss may be a reconstruction loss that penalizes a disparity between a super-point and a reconstruction of the super-point. The reconstruction of the super-point is another super-point. The reconstruction of the super-point is obtained from the latent vector encoding the super-point, i.e., the latent vector being obtained by application of the neural network (or an encoder thereof) to the super-point. The reconstruction of the super-point may for example by the result of applying a decoder of the neural network to the latent vector encoding the super-point. This is for example the case when the neural network is an autoencoder comprising an encoder and a decoder, as previously discussed. Using a reconstruction loss allows to assess whether a reconstruction of a super-point as encoded by the neural network is sufficiently geometrically similar to the super-point, which, implicitly, enables to assess whether the super-point is encoded into a latent vector which is sufficiently geometrically meaningful. The reconstruction loss also allows to ensure accurate reconstruction by the decoder.

The disparity may be any quantification of a geometrical disparity/dissimilarity between two super-points. For example, the disparity may be a distance between super-points. In other words, the loss may be a reconstruction loss penalizing a distance between a super-point and the reconstruction of the super point. The distance may be any distance between super-points, such as any distance between 3D point-clouds. For example, the distance may be the Chamfer distance, which provides an economy of computing resources required for performing the learning S30. The Chamfer distance ($d_{CD}$) is given by the following formula:

$$d_{CD}(S_1, S_2) = \sum_{x \in S_1} \min_{y \in S_2} \|x - y\|_2^2 + \sum_{y \in S_2} \min_{x \in S_1} \|x - y\|_2^2,$$

where $S_1$ and $S_2$ are two sets of super-points, where x and y designates points (i.e., 3D points with 3D coordinates) of $S_1$ and $S_2$, respectively, and where $\| \|_2$ designates the Euclidean 3D norm. Alternatively, the distance may be the Earth-Mover distance.

Figure 9:
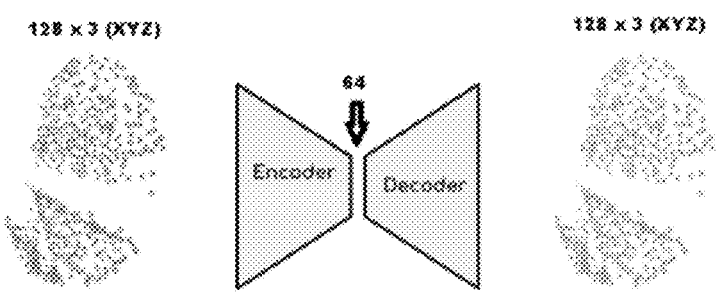

Prior to the learning S30, the learning method may comprise adapting the size of the super-points. In other words, the learning method may comprise, prior to the learning S30, a sub-sampling and/or an up-sampling of the points of each super-point in the training dataset, so that each super-point matches the input size of the neural network. For example, the points of each super-point may be such that, after the sub-sampling and/or an up-sampling, each super-point comprises N points each equipped with 3D coordinates. In such a case, the size of the latent vectors may be equal to N/2. FIG. 9 shows a schematic representation of an autoencoder with input size N=128 and a latent vector size N/2=64.

As previously explained, the learning S30 modifies the weights (also referred to as the parameters) of the neural network until the loss has a sufficiently low value on (e.g., all or a significant part of) the samples of the training dataset the super-points). These concepts are known per se in the field of machine learning. The neural network may be a Deep Leaning Model Deep learning models (also referred to as DNNs) generally feature millions of parameters which values cannot be set by hand characterize these models. These parameters are set during the learning of the model, with a learning algorithm. When the learning algorithm is updating the model parameters, the model is said to be in "training mode". It consists in successively "correcting" the model according to its output for each input thanks to the inherent characteristics of each input and, optionally, annotations associated with it if any. Once the model is trained, the update of its parameters stops. Then, the model is only used at an online stage to process a new input (i.e., an unseen input during the training mode) and return results, it is said to be in "test mode". In the present disclosure, the model (i.e., the neural network) may be a DNN, so that these considerations may apply to the model.

The learning S30 may be unsupervised, i.e., the learning S30 may be an unsupervised learning. In the unsupervised learning paradigm for 3D point cloud feature extraction, no annotation is given about the point clouds that are used during the learning. This means that the feature extraction will only rely on the point cloud characteristics (e.g., coordinates of the 3D points) and not on any labelling (e.g., extract similar features for all the point clouds from the same labelled category). Using such training/learning tends to ensure that the learned neural network is agnostic to the type of the point cloud it will take as input, to the class/category of the object(s) or scene represented by the point cloud, and/or to their context (e.g., indoor or outdoor).

The detection method is now further discussed.

The providing S40-S50 of the one or more first super-points and of the one or more second super-points may comprise directly (e.g., without computations) providing already computed first super-point(s) and second super-point(s). Alternatively, the providing S40-S50 may comprise providing S40 the first 3D point cloud and the second 3D point cloud and extracting S50 the one or more first super-points from the first 3D point cloud and the one or more second super-points from the second 3D point cloud. The extracting S50 may be performed as the extracting S20 previously discussed, e.g., using the same distance-based method or geometry-based method. The providing S40 of the first 3D point cloud and of the second 3D point cloud may be performed as the providing S10 previously discussed.

The first 3D point cloud represents a 3D scene. The scene is a real scene, i.e., a portion of the real-world. The first 3D point cloud may be measured, i.e., may stem from physical measurements, e.g., the first 3D point cloud may have been obtained by operating one or more physical sensors (e.g., LIDARs) on the scene as it is in the real world, as previously discussed. Alternatively, the 3D point cloud may have been generated from a virtual 3D scene (e.g., of a CAD environment), as previously discussed. The 3D scene may be a manufacturing scene, e.g., the inside of a plant/factory, or a portion thereof. The 3D scene may thus comprise 3D objects of the manufacturing world, e.g., mechanical parts being manufactured or already manufactured, or manufacturing tools, such as articulated manufacturing robots.

The second 3D point cloud represents a 3D object, for example a 3D object of the manufacturing world. The second 3D point cloud may be synthetically generated, as previously discussed, or may stem from physical measurements, i.e., may be a measured 3D point cloud. The 3D object may be similar or partially similar (e.g., up to occlusions and/or movements such as rotations) to one or more 3D objects in the first 3D point cloud. The detection method detects these 3D objects, or at least a part of them, as discussed hereinafter.

The one or more second super-points may be referred to as "the query", as they are the super-points for which similar super-points will be searched for in the first 3D point cloud by the detection method, as discussed hereinafter. This amounts to say that the detection method detects similar 3D shapes/object to that of the query. The query may be provided by a user. The first point cloud may be referred to as "the search area" as objects similar to that of the query area searched for in the first point cloud by the detection method. The first 3D point cloud may be a large point cloud, e.g., a ratio between the number of points in a 3D point cloud and a size of the memory of the computer carrying out the method(s) may be larger than a predefined threshold. For example, the first 3D point cloud may comprise about or more than 100 million of points for a memory size of 16 Gigabytes (which corresponds to a standard or cheap computer) and/or may comprise 20 times the number of points in the second 3D point cloud.

The detection method determines a similarity between extracted super-points. To reduce the number of extracted super-points for which a similarity is determined, the providing S40-S50 of the one or more first super-points may comprise a prior optional filtering, which is now discussed.

Specifically, the providing S40-S50 of the one or more first super-points may comprise providing one or more initial super-points of the first 3D point cloud by extracting S50 them from the first 3D point cloud provided at S40, as previously discussed. Then, the providing S40-S50 may comprise filtering the one or more initial super-points by selecting, among the initial super-points, each initial super-point for which:
  a disparity between dimensions of the super-point and dimensions of at least one second super-point is smaller than a predefined threshold; and/or
  a disparity between a position of the super-point and a position of at least one second super-point is smaller than a predefined threshold.

The selected super-points constitute the one or more first super-points.

The providing S40-S50 may thus first provide the initial super-points, e.g., by extracting them from the first 3D point cloud, and then select among them those that are sufficiently similar, geometrically, to at least one second super-points. This allows to filter the super-points of the first 3D point cloud, which may contain many (e.g., the initial super-points may altogether cover in all the points of the first 3D point cloud). Thereby, the detection method will then only have to assess similarities between a filtered (i.e., smaller) set of first super-points and the second super-points.

The selection of the initial super-points that are sufficiently similar, geometrically, each to at least one second super-points, is based on the disparity between the dimensions and/or the positions of the initial super-points and the second super-points. Specifically, for each initial super-point, the detection method assesses whether a disparity between dimensions (e.g., each dimension) of the initial super-point and dimensions (e.g., each dimension) of at least one second super-point is smaller than a predefined threshold, and/or the detection method assesses whether a disparity between a position of the initial super-point and a position of at least one second super-point is smaller than a predefined threshold. Then, the method selects, as the one or more first super-points, the initial super-points for which the disparity between dimensions of the initial super-point and dimensions of at least one second super-point is smaller than the predefined threshold, and/or the disparity between the position of the initial super-point and the position of at least one second super-point is smaller than the predefined threshold. Each disparity may be any quantification of a geometrical disparity, such as a distance or a ratio.

The filtering may comprise selecting, among the initial super-points, each initial super-point for which:
  a distance between each dimension of the super-point and a corresponding dimension of at least one second super-point is smaller than a predefined threshold; and/or a ratio between each dimension of the super-point and a corresponding dimension of at least one second super-point is smaller than a maximal ratio and larger than a minimal ratio; and/or a difference between a relative height from a closest support surface of the super-point and a relative height from a closest support surface of at least one second super-point is smaller than a predefined threshold.

The above-listed distance between each dimension, ratio between each dimension, and difference between relative height are each a quantification/measure of a geometrical disparity between super-points. The dimensions of a super-point may be the dimensions of the super-point in its local reference frame (LRF, as discussed in reference J. Yang et. al., "*Toward the Repeatability and Robustness of the Local Reference Frame for 3D Shape Matching: An Evaluation*", in IEEE Transactions on Image Processing, vol. 27, no. 8, pp. 3766-3781, August 2018, which is incorporated herein by reference).

For each initial super point, the detection method may select the initial super-point if the distance between each dimension of the super-point and the corresponding dimension of at least one second super point is smaller than a predefined threshold, for example by determining that there exists a second super-point for which the distance between each dimension of the initial super-point and the corresponding dimension of the second super point is smaller than the predefined threshold. To do so, the method may determine, whether there exists a second super-point for which, for each dimension i of the second super-point:

$$\|spq_{dim_i} - sprz_{dim_i}\| < d_{max},$$

where $spq_{dimi}$ is the dimension i of the second super-point, $sprz_{dimi}$ is the dimension i of the initial super-point of the search area, $d_{max}$ is the predefined threshold, also referred to as maximal difference accepted between the size of 2 super points, and $\|.\|$ is any suitable norm. $d_{max}$ may belong to a range of value, the range being for example defined as a function of (i.e., depending on) the query and the variability that is aimed for in the 3D detection. The range may for example be a function of the reality represented by the second 3D point cloud, for example the context and/or the quality of the point cloud acquisition. For example, $d_{max}$ may equal 20 cm for all the 3D objects involved, in the case where they all have super-points having minimal and maximal dimension comprised between 1 cm and 1 m. $d_{max}$ may be larger if the 3D objects involved in the learning method have larger dimensions. $d_{max}$ may be decreased if the point clouds involved in the learning method are synthetic point clouds, or point clouds acquired with very accurate scans, because they will feature less noise. $d_{max}$ may in examples belong to the range [5 cm; 1 m] and may be a function of the regularization weight of the graph-cut which has been previously discussed.

Additionally or alternatively, the detection method may select the initial super-point if the ratio between each dimension of the super-point and the corresponding dimension of at least one second super point is smaller than a maximal ratio and larger than a minimal ratio, for example by determining that there exists a second super-point for which the ratio between each dimension of the initial super-point and the corresponding dimension of the second super point is smaller than the maximal ratio and larger than the minimal ratio. To do so, the method may determine, whether there exists a second super-point for which, for each dimension i of the second super-point:

$$r_{min} < \frac{spq_{dim_i}}{sprz_{dim_i}} < r_{max},$$

where $spq_{dimi}$ is the dimension i of the second super-point, $sprz_{dimi}$ is the dimension i of the initial super-point of the search area, $r_{min}$ is the minimal ratio, also referred to as the minimal accepted ratio, and $r_{max}$ is the maximal ratio, also referred to as the maximal accepted ratio. $r_{max}$ and $r_{min}$ may be chosen based on the quality of the point clouds involved in the method, the manner with which the super-points are chosen, and the variability aimed for with the query, i.e., the more the point clouds' quality is bad, the more the super-points' cut is inaccurate and/or the more the variability aimed for is important, the more $r_{min}$ can be decreased and the more $r_{max}$ can be increased. $r_{max}$ may be larger than 1.5 and/or smaller than 6, for example equal to 4, and/or $r_{min}$ may be larger than 0.1 and/or smaller than 0.9, for example equal to 0.2. Additionally or alternatively, the detection method may select the initial super-point if the difference between a relative height from a closest support surface of the super-point and a relative height from a closest support surface of at least one second super-point is smaller than a predefined threshold, for example by determining that there exists a second super-point for which the difference between the relative height of the initial super-point from its closest support surface and the relative height of the second super point from its closest support surface is smaller than the predefined threshold. The relative height captures a difference between a position hoped for in the query and a position in the search area. The position hoped for may be defined as a function of parameters of movements in the query. The predefined threshold may be chosen as a function of an uncertainty about the super-points accuracy and an admitted variability of with the query. For example, the predefined threshold may be equal to the query height divided by 4. The predefined threshold may for example equal 30 cm.

The closest support surface of a super-point is a planar surface having as normal axis the vertical axis or any vector sufficiently close to the vertical axis (i.e., for which a norm of its cross product with the vertical axis is lower than a predefined threshold). The closest support surface may thus represent the floor, or any other real-world physical support of the shape represented by the super-point, for example a table, a desk, a conveyor, or a worktop. The detection method may compute or detect the closest support surfaces of the super-points involved in the detection method for performing the selection among the initial super-points. The detection of a closest support may be carried out by any known method. For example, they may be detected automatically during the previously-discussed geometry-based extraction of the super-points by performing a PCA on the neighborhood of each point and a minimal cut in the adjacency graph and detecting the super-points having the characteristics of a horizontal plan (e.g., by using the value of planarity onto the horizontal plane for each super-point).

In other words, for each initial super-point, the detection method may use for the selection one or more of the above-listed distance between each dimension, ratio between each dimension, and difference between relative heights. The selected initial super-point(s) form the one or more first super-points.

The detection method then encodes S60 each first super-point each into respective first latent vector by applying the neural network, or an encoder thereof, to the first superpoint. The method also encodes each second super-point each into respective second latent vector by applying the neural network, or an encoder thereof, to the second super-point.

Then the detection method determines S70 a similarity between each first super-point of one or more (e.g., all the) first super-points and each second super-point of one or more (e.g., all the) second super-points. For that, for each first super-point of one or more (e.g., all the) first super-points and each second super-point of one or more (e.g., all the) second super-points, the method computes a similarity measure between the respective first latent vector encoding the first super-point and the respective second latent vector encoding the second super-point. All the first and second super-points may be involved in the determination S70 of the similarity. Notably, when the detection method contemplates the prior filtering of the first super-points, as previously discussed, then all the first and second super-points may then be involved in the determination S70 of the similarity as the prior filtering already ensures the relevance of these super-points for detecting geometrical similarity. Thus, involving all the super-points is relevant for the 3D detection while being relatively economical in terms of computing resources used for the determining S70.

The similarity measure may be any measure/quantification of a similarity between latent vectors. Now, since the latent vectors are geometrically meaningful latent representations of the super-points they encode, computing a similarity measure between them amounts to determine a geometrical similarity between the super-points. The similarity measure may be the cosine similarity measure $cs(e_i, e_j)$ which is of the type:

$$cs(e_i, e_j) = \frac{e_i \cdot e_j}{\|e_i\| \|e_j\|},$$

with $e_i$, $e_j$ the latent vectors encoding two super points. The similarity measure may be any other similarity measure, for example a Euclidean distance, e.g., in the case where the neural network has been learnt by forcing a regularization on the latent space.

The computation of the similarity measures yields similarity scores, each between a first super-point and a second super-point, each similarity score being a value computed at S70) of the similarity measure between two latent vectors. Therefore, the determining S70 yields similarity scores between shapes of the first 3D point cloud, i.e., first super-points representing local parts of 3D objects therein, and shapes of the second 3D point cloud, i.e., second super-points representing local parts of the 3D object represented by the second 3D point cloud. The method may further comprise assessing, among the computed similarity scores, the similarity scores which are higher than a predefined threshold. Each respective one of these similarity scores represents a couple of a first super-point and a second super-point for which the value of the similarity measure between their two encoding latent vectors is higher than a predefined threshold. The first super-point is in this case said to be matched with the second super-point. The predefined threshold may be defined with respect to the encoder projection properties and/or a level of similarity desired by a user. The predefined threshold may also be obtained automatically, based on a dataset of super-points manually annotated as similar (e.g., for a target application). In this case, the threshold may be obtained by computing the minimal similarity obtained between two super points labelled as similar. With this automatic obtention, the predefined threshold may belong to the range [0.7; 1] (e.g., and may be chosen depending on the similarity aimed for and/or on the architecture used), for example may be equal to 0.8.

The detection method may thus provide, after the determining S70 set of n matched first super-points in the search area ($SP_{rz}^1, \ldots, SP_{rz}^n$) with their corresponding matching/similarity scores mg with the matched super-points in the query ($mq_i, \ldots mq_m$), ... ($mq_i, \ldots mq_k$)).

The detection method may further comprise grouping S80 together matched first super-points, so that the first-points are sorted into several groups and each group represents a 3D object of the first 3D point cloud that is similar to the 3D object of the second point cloud formed by the second super-points (i.e., the query). Thereby, after having determined local shapes in the first 3D point cloud (i.e., matched first super-points) which are similar to local shapes in the query (i.e., second super-points), the detection method, by grouping S80 the matched first-super points into groups, finds 3D objects in the first 3D point cloud which are geometrically similar to the 3D object represented by the query.

The grouping S80 may consist in determining S80, among first super-points each having a determined similarity with at least one second super-point that is larger than a predefined threshold (i.e., among matched first super-points), one or more groups of first super-points, each group of first super-points having a similar shape than the second 3D point cloud. In other words, the determining S80 may compare geometrical properties of the matched first super-points, for example relative orientations and/or relative positions to each other and/or or to a referential point (e.g., the center of the query), with corresponding properties of the super-points of the query, so that the matched first super-points may be grouped into groups each geometrically similar to the query. The detection method may perform the determining S80 with any known grouping method. The grouping may be rotation-invariant, i.e., the grouping detects a group of first super-points which is similar to the query even if the group represents a rotation of the 3D object represented by the 3D point cloud.

Examples of the grouping S80 are now discussed.

In an example, the determining S80 of the one or more groups may be carried out according to a method for computing a graph from the set of super-points in the query, which is now discussed. This method yields complete graphs of the type: $G_q=(SPs_q, E)$, where the $SPs_q$ are nodes representing super-points and E is a set of edges each connecting two nodes. This method comprises providing (e.g., determining, by any known method) a graph of second super-points. The graph of second super-points has nodes and edges, each edge connecting two nodes. Each node represents a second super-point. Each node may have an attribute, which may be one or more of an encoder feature and/or a dimension. Each edge represents a geometrical relation between the two super-points represented by the nodes connected by the edges. The geometrical relation may be a relative positioning and/or orientation of the two super-points with respect to each other. The edge has one or more geometrical attributes of the geometrical relation. The attributes may form data associated with the edge. The attributes may comprise one or more of:

a distance between the centroids of the two super-points represented by the nodes connected by the edges, for example a plausible distance when the super-points belong to a 3D point cloud representing an articulated object (e.g., an articulated manufacturing robot), and/or a relative orientation between surfaces of the two super-points represented by the nodes connected by the edges, for example a plausible orientation when the super-points belong to a 3D point cloud representing an articulated object (e.g., an articulated manufacturing robot).

The providing of the graph may comprise determining (e.g., computing) the geometrical attributes, e.g., for each edge. For example, the surfaces of the super-points may be obtained by a local reference frame (LRF) estimation, as known per se in the art, for example the LRF estimation performed in reference J. Yang et. al., "*Toward the Repeatability and Robustness of the Local Reference Frame for* 3*D Shape Matching: An Evaluation*", in *IEEE Transactions on Image Processing*, vol. 27, no. 8, pp. 3766-3781, August 2018, which is incorporated herein by reference.

Further to the providing of the graph, the method for computing a graph from the set of super-points in the query then comprises forming one or more graphs. Each graph has nodes and edges, each edge connecting two nodes. Each node represents a first super-point. Each edge represents a geometrical relation between the two super-points represented by the nodes connected by the edges. The geometrical relation may be of the same nature that the geometrical relations in the provided graph, for example it may be a relative positioning and/or orientation of the two super-points. The forming of the one or more graphs is carried out by constructing the edges of each graph, e.g., for all the graphs simultaneously or for each graph one by one. Each constructed edge connects two nodes (i.e., representing each a matched first super-point). Each constructed edge has one or more geometrical attributes similar to geometrical attributes of an edge of the graph of second super-points. For example, the construction of the edges may comprise identifying sub-graphs of the provided graph and reconstructing the subgraph but for the first super-points, e.g., in a bottom-up manner.

Specifically, the construction of the edges may comprise iteratively exploring matched first super-points, and for each explored first super-points, finding one or more plausible edge each for connecting a node representing the explored first super-point to another node representing another first super-point. By "plausible edge", it is meant an edge having attributes matching the attributes of an edge that connects two nodes representing two second-super points matched with the two first super-points in the provided graph. The finding of the edge may comprise assessing whether if constructed, the edge would have similar attributes than an edge that exists in the provided graph and that connects two nodes representing two second-super points matched with the two first super-points which would be connected by the edge if constructed. If it is the case, the finding constructs the edge. The construction of the edges may thus comprise computing their attributes, which may be carried out exactly as for the provided graph. By "similar attributes" or "matched attributes", it is meant in examples attributes that are equal or substantially equal or of which difference (e.g., measured by a distance and/or a ratio) is lower than a predefined threshold, e.g., defined with respect to the number of points in the query. The finding of the plausible edges may in example be optimized by only comparing edges for super-points that are distant with a distance inferior to the maximal plausible distance between two super-points of the query (or inferior to the expected maximum size of the query).

Each formed graph results from the construction of its edges (i.e., the construction of the edges results in the formed one or more graphs). Each graph corresponds to a respective group of first super-points, i.e., the nodes of the graphs represent the super-points of the group. The edges of the graph are each similar to an edge of the provided graph.

The previously discussed example of the grouping S80, that is by providing the graph of second super-points and forming the one or more graphs of the first super-points, is particularly robust, as it can form groups of first-super-points each representing a 3D object in the search area that is similar to the 3D object in the query, regardless of whether the 3D objects are non-articulated objects or articulated objects.

In another example, the determining S80 of the one or more groups may be carried out by using the Hough Voting method for the center of an object, this method being discussed in reference F. Tombari et. al., "*Hough Voting for* 3*D Object Recognition under Occlusion and Clutter*", IPSJ Transactions on Computer Vision and Application March 2012, which is incorporated herein by reference. This method tries to determine potential similar objects centers by voting for each super-point of the search area according to the one or several super-points of the query that it matched with. This may comprise capturing the relative orientation of the super-point of the query and the super-point in the search area in order to vote in the same direction and orientation. Such relative orientation can be obtained through a LRF estimation, for example the LRF estimation performed in reference J. Yang et. al., "*Toward the Repeatability and Robustness of the Local Reference Frame for* 3*D Shape Matching: An Evaluation*", in *IEEE Transactions on Image Processing*, vol. 27, no. 8, pp. 3766-3781, August 2018, which is incorporated herein by reference.

As known from previously-cited reference F. Tombari et. al., "*Hough Voting for* 3*D Object Recognition under Occlusion and Clutter*", IPSJ Transactions on Computer Vision and Application March 2012, the Hough Voting method may comprise defining a 3D grid that decomposes into a set of voxels the 3D space of the search area. The optimal size of the 3D grid may be defined with respect to the size of the query and the precision for estimating the LRF votes. In an example, the size of the voxel may be given by the formula:

$$\text{size} = \max(\text{querydims}) * f * \text{corr}_{LRF},$$

with querydims the dimensions of the query when axis aligned, f a factor to decide about the precision for the center (e.g., f may equal 0.2) and $\text{corr}_{LRF}$ a factor to attenuate the effect of approximate LRF, especially for large objects (e.g., $\text{corr}_{LRF}$ may equal 1.5 for a standard LRF implementation based on the covariance matrix).

As known from previously-cited reference F. Tombari et. al., "*Hough Voting for* 3*D Object Recognition under Occlusion and Clutter*", IPSJ Transactions on Computer Vision and Application March 2012, the Hough voting method may then aggregate votes voxels, for example by counting for the number of different matched super points of the query per voxel. This may involve the use of a threshold defined with respect to the number of super-points in the query, to decide which voxels represent potential object centers similar to the query. This threshold controls the number of plausible occlusion and the variability that may be target for certain parts of the object. Therefore, it can directly be accessible as a parameter that the user can modify during the inference/detection.

Figure 10:
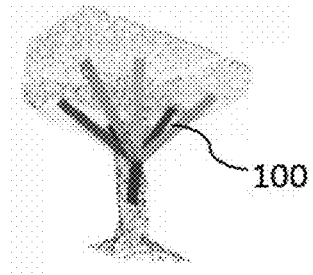
Figure 11:
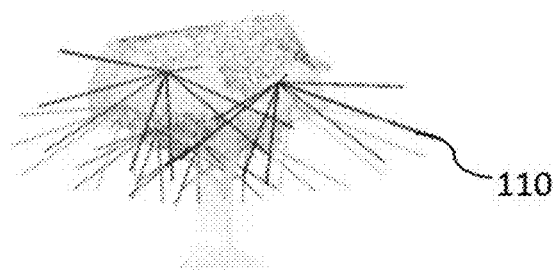
Figure 12:
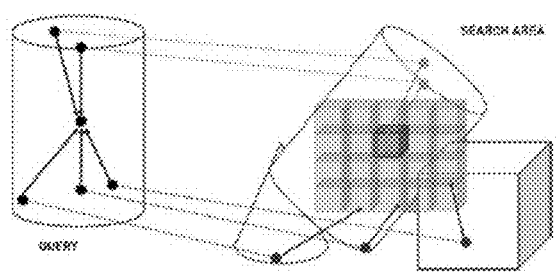

FIGS. 10 to 12 illustrate the Hough Voting method. FIG. 10 shows the point cloud already illustrated on FIG. 2, with its extracted super-points. These super-points represent the query. The distances from each super-point center and the center of the query are shown on FIG. 10. For example, reference 100 indicates such a distance. FIG. 11 shows a group of super-points in the search area that form an object similar to that represented by the point cloud of FIG. 10. FIG. 11 also shows the votes casted from the center of each super-point. For example, reference 110 indicates such a vote. FIG. 12 is an illustration showing that the Hough Voting method casts rotation-aware votes.

It is to be understood that the grouping S80 is not necessarily carried out in the detection method. For example, the second point cloud may be composed of only one super-point, so that no grouping is necessary.

The detection method may further comprise determining S90 a bounding box for each determined group. The bounding box englobes circles the group. The determining S90 of the bounding box may comprise drawing the bounding box around the center of each group, e.g., and prior to that, determining this center. The size and/or the dimensions of each bounding box may be equal or substantially equal to the size of a (e.g., minimal) bounding box for encompassing the second 3D point cloud.

In the case where the grouping S80 uses the previously-discussed method for computing a graph of super-points, the bounding boxes can be drawn each so as to englobe a respective group of first-super-points and may have a size that is equal or substantially equal to the size of a (e.g., minimal) bounding box for encompassing the query.

In the case where the grouping S80 uses the Rough Voting method, upon decision on plausible object center, the bounding boxes can be drawn in the search area: centered on the plausible centers (with the same dimensions as the bounding box query) and/or around the super points that casted votes for the voxel representing the plausible object center.

It is to be understood that when the grouping S80 is not carried out by the detection method, as previously discussed, the determining S90 may simply determine a bounding box around each matched super-point.

The determining S90 may also determine a bounding box around the second 3D point cloud. The detection method may further comprise displaying each determined bounding box. This provides a user of the detection method with a visual feedback of the 3D objects detected in the search area.

The detection method may further comprise for each group, determining a similarity score of the group by measuring a similarity of the first super-points in the group with the one or more second super-points. The similarity score of each group is a score of a geometrical similarity between the group and the group of super-points formed by the one or more second super-points. The detection method may determine the similarity score by computing any of such score of geometrical similarity. The similarity may be application-depending and/or based on several cues. The similarity score may comprise one or more of the following:

Super points matching similarity score (spins): it is combination of matched super-points matching scores (with the identified super-points of the query) for a given group of first super-points. Here n is the number of super-points in the query, the matching score for each of them with the group of first super-points (if no match, $m_i=0$), and the score is given by the formula:

$$spms = \frac{\sum_{i=0}^{n} m_i}{n},$$

Color histogram comparison, for example for applications where color information is available (e.g., extinguisher detection). The histogram can be computed on all the points from the search area comprised in the bounding box or on the matched super-points only, and/or Any global shape descriptors that can be used on all the points from the search area comprised in the bounding box or on the matched super-points only.

The above-listed similarity scores (also referred to as similarity metrics) can be used together to get a global similarity score or used separately depending on the target application.

The detection method may further comprise, further to the determination of the similarity scores for each group, displaying the similarity score of the group. The detection method may for example display the similarity scores of all the groups simultaneously, e.g., the display being arranged according to a decreasing rank of the similarity scores. The detection method may also display, simultaneously to the display of the similarity scores of the groups, the bounding boxes around the groups, and optionally around the second point cloud. The detection method may also display the dimensions of the bounding boxes. The method may also display, for each group, a visual indication that the similarity score of the group is above a similarity score threshold.

The similarity score threshold may be a percentage of similarity. The similarity score threshold may be selected by a user. For example, the similarity score threshold may be displayed to the user as a slider having a line representing all the possible values of the threshold (e.g., from 0% to 100%) and a handle (of any shape) that the user may graphically select (e.g., with a click or a touch on the handle) and slide (e.g., with a drag-and-drop operation) along the line to set the value of the similarity score threshold. The slider may be part of a widget displayed on the graphical user interface of the computer used by a user using the detection method, a widget being a software component stored in a memory. The selection of the threshold by the user may occur before the execution of the detection method, e.g., as an initial step of the method, so that the user predefines the similarity score he/she wishes, and the bounding boxes he/she wants to be displayed. Additionally or alternatively, the selection may also occur after the determination S90 of the bounding boxes so that the user triggers the display of only the bounding boxes enclosing a group having a sufficient similarity score. Alternatively, the user may select the similarity score threshold continuously during execution of the method, e.g., upon the user selecting the similarity score threshold, the steps of the detection method are executed so that the bounding boxes enclosing groups each having a similarity score above the threshold are detected (i.e., the groups are detected, and the bounding boxes are then created) and displayed in real-time as a result of the user selection, the display of the bounding boxes being adapted continuously and in real-time depending on the user continuously changing the similarity score threshold.

Figure 13:
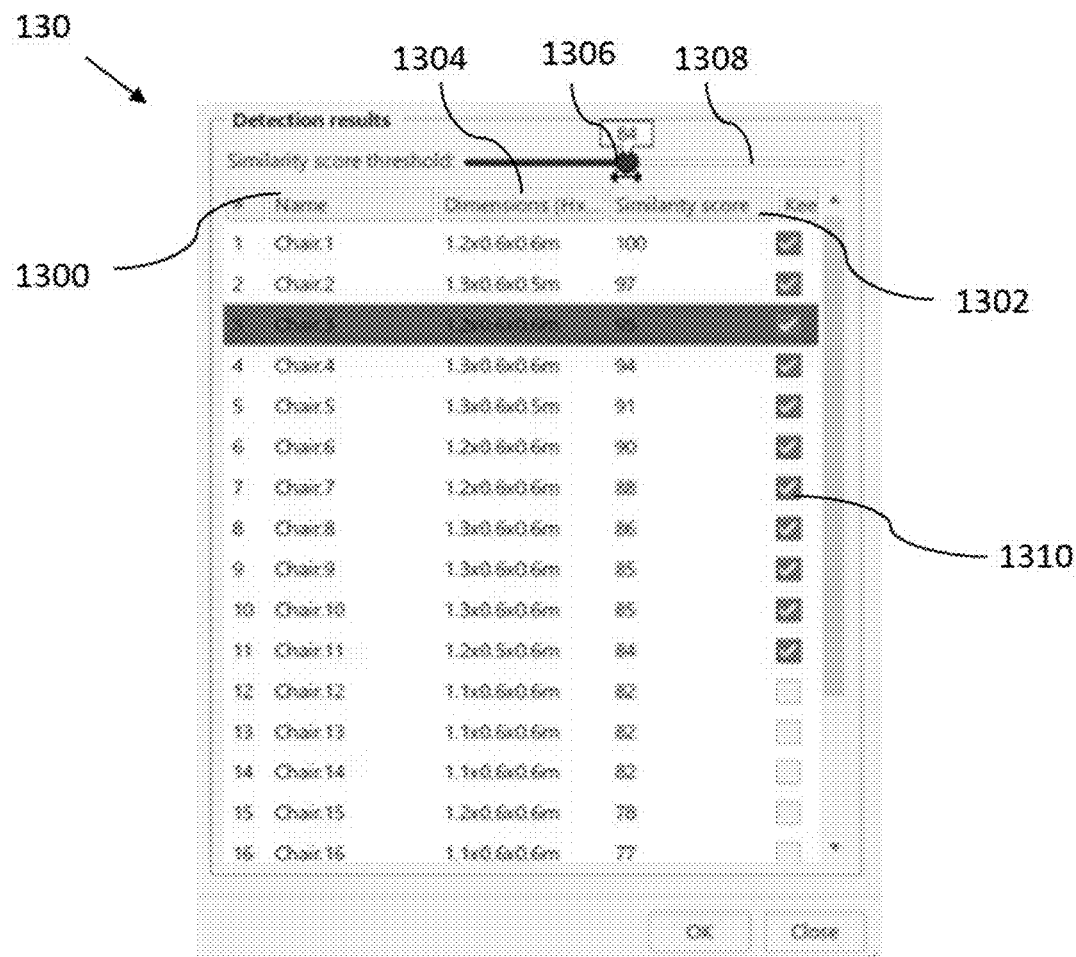

FIG. 13 shows a screenshot of a widget 130 displayed on a graphical user interface of a computer used by a user of the detection method. The widget allows for selection of the similarity score threshold. The widget 130 displays in a column 1300 the detected groups of first-super points with names assigned to each of them. The widget 130 further displays a column 1304 of the dimensions of the bounding boxes for each group. The widget 130 further displays a column 1302 of the similarity scores for each group. The widget further displays a column with, for each group, a visual indication 1310 that the similarity score of the group is above (or not) the similarity score threshold. The widget comprises a slider made of a line 1308 and of a handle 1306. The user may graphically select (e.g., with a click or a touch on the handle) the handle 1306 and slide it (e.g., with a drag-and-drop operation) along the line 1308 to change the value of the similarity score threshold. In the screenshot illustrated on FIG. 13, the threshold is set to 84%.

An implementation of the process integrating the learning method and the detection method is now discussed.

The implementation allows example-based 3D object detection, which consists in localizing similar shapes/objects to a given point cloud example, in a larger point cloud. Localization is based on 3D bounding-boxes around detected objects. The implementation employs a deep learning approach for the detection. The assessment criteria for this implementation are as follows:

Given as input a point cloud query (example) and a larger point cloud (search area), The implementation seeks to have as output 3D bounding-boxes around similar objects to the query, in the search area. However, it is not known in advance the number of objects to be detected. Note that the search area could not contain similar object to the selected query.

The Example-based object detection should be class-agnostic, i.e., able to detect similar object to any object query.

The Example-based object detection should be context-agnostic, i.e., the detection is independent to the object context/background (e.g., indoor, outdoor). No prior knowledge specific to the point cloud context is used.

The point cloud representation should be robust to noise, occlusion, point distribution and also invariant to different types of transformation (e.g., rotation) and object positions (e.g., articulated objects such as robotic arms). This is enables by the local learning-based representation used.

The implementation aims to localize similar objects not necessarily the exact instances representing the query.

In fact, the query could not belong to the search area.

This implementation offers genericity, i.e., the detection does not depend on object (even unseen objects/context during offline training) and point cloud type (no particular constraint is required on point cloud acquisition). This implementation is able to localize partially similar shapes given a single shape query (i.e., not only localize the exact instances corresponding to a given shape query). This implementation allows 3D shape detection, in which one aims at detecting shapes in a point cloud.

This implementation provides a learning-based framework to perform efficient and generic 3D detection of all similar shapes to a given shape query, in a point cloud. The learning part of the framework is based on deep learning technique (i.e., using deep neural networks).

Figure 14:
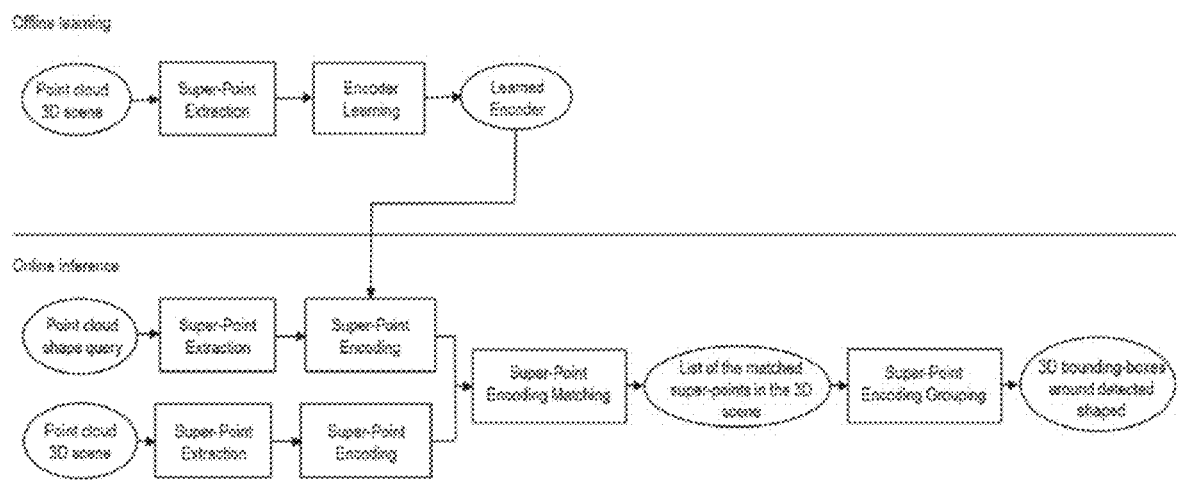

The implementation follows the framework described in FIG. 14. As shown on FIG. 14, the implementation comprises an offline stage and an online stage:

Offline stage: this stage trains an encoder based on super-points. It contains two main steps. Note that this stage is transparent from the user. The two main steps are:

Super-point extraction. A super-point is a subset of points describing a local part of a given point cloud. There is a consistency between the super-points extracted from an isolated point cloud object and the same object in a scene, i.e., with other objects.

Encoder learning based, on the training dataset of super-points. It consists in a point cloud DNN-based model.

Online stage: given a point cloud shape query and a point cloud scene, super-points are extracted from both inputs, then encoded using the learned encoder during the offline stage. The super-point encoding of the query is compared to the super-points encoding of the scene. The most similar ones to one super-point encoding are matched.

Offline Learning

The offline learning trains an encoder that is able to project any 3D super-point into a latent representation that presents meaningful geometrical information, i.e., so that a distance between encodings of two super-points be highly correlated to the geometrical similarity of those two super-points (for example with respect to the orientation of the super-points). The distance is defined as a measure of similarity between the two vectors, such as the cosine similarity or the Euclidean distance Dataset Generation: Super-Point Extraction First a dataset of super-points is constructed to train the encoder. The variety of super points on which the encoder will be trained on is directly responsible for its ability to construct a meaningful projection of any 3D geometry. The dataset of super-points can be extracted from any set of one or several point clouds scene(s) that contains a variety of geometries. The extraction of super points is fully unsupervised, therefore no annotations for the point clouds scene(s) are needed.

Point Clouds Scene(s)

The point cloud scenes used for the training are generated, but without simulating virtual scanner. Given, CAD models of various objects, the generation comprises converting the CAD models them into point clouds and then inserting them into point cloud backgrounds. While object insertion, possible occlusions (object/object occlusions or object/background occlusions) as well as point density normalization for realistic synthetic point cloud representation. are taken into account. 100 scenes are used for the learning/training.

Super Point Extraction

This implementation uses a the geometric-based method for super-point extraction, as previously discussed. Such a method presents interesting characteristics. The fact that a super-point usually corresponds to only one uniform part of the point cloud (due to the cut obtained in the adjacency graph) makes it more convenient for further processing: it usually means that a super point is a part of a single object, depending on the regularization weight of the cut. This offers at least two interesting properties for this implementation:

the super-point extraction is quite consistent between the super-points extracted from an isolated point cloud object and the same object (or similar ones) in a scene, i.e., with other objects, and a super-point obtained with such a method regroups points with similar geometrical properties, thus simplifying the complexity needed for the encoder learning step.

Encoder Learning

The loss used in the implementation is a reconstruction loss. The loss is the Chamfer loss, which provides efficiency in terms of computation expensiveness. The loss is given by the following formula, given two sets of points $S_1$ and $S_2$:

$$d_{CD}(S_1, S_2) = \sum_{x \in S_1} \min_{y \in S_2} \|x - y\|_2^2 + \sum_{y \in S_2} \min_{x \in S_1} \|x - y\|_2^2$$

Any neural network that consumes point cloud as input and project them in a lower dimension space while being invariant to rotations can be used, such as the one discussed in reference R. Spezialetti et/ al. "*Learning on Effective Equivariant 3D Descriptor Without Supervision*", ICCV 2019, which is incorporated herein by reference. In the implementation, the training is unsupervised.

The model is trained using the previously generated dataset of super-points. Depending on the number of features that to consider for the point clouds, the model is trained with a corresponding input size. In the implementation, the number of points in the super-points are sub-sampled or up-sampled, so that it matches the input size of the neural network. The input size of the implementation is N=128 points per super points with features being the 3D coordinates and an encoding having a size of N/2.

Online Inference

Super Point Encoding Matching

Upon obtention of the set of super-points for the query and the search area, this implementation computes the similarity between each super point in the search area with each super point in the query. Since this step can be quite time consuming, this implementation may comprise the following filtering in order to avoid useless comparisons:

Dimension comparison between the super points when projected into their LRF, as discussed in reference J. Yang et. al, "*Toward the Repeatability and Robustness of the Local Reference Frame for 3D Shape Matching: An Evaluation*", in IEEE Transactions on Image Processing, vol. 27, no. 8, pp. 3766-3781, August 2018, which is incorporated by reference. If the ratio between the dimensions per corresponding axis is two far from 1 and the difference per dimension is superior to a certain threshold, the super-point of the search area is not considered as a potential matching candidate for the given super-point of the query. In other terms, this implementation seeks to have, per dimension i:

$$\|spq_{dimi} - sprz_{dimi}\| < d_{max} \text{ or } rmin < \frac{spq_{dimi}}{sprz_{dimi}} < rmax$$

with: $spq_{dimi}$ the dimension i of the super point of the query, $sprz_{dimi}$ the dimension i of the super point of the search area, $d_{max}$ the maximal difference accepted between the size of 2 super points (e.g., 20 cm), man the minimal accepted ratio (e.g., 0.2) and $r_{max}$ the maximal accepted ratio (e.g., 4) for each dimension i of the super points in their LRF; and/or Relative height from the floor or the closest support surface. If the difference between the super points center height from the floor (or the closest support surface) is above a certain threshold (e.g., 30 cm), the super point of the search area is not considered as a potential matching candidate for the given super point of the query. Note that the closest support surface can be detected by any place detection algorithm (e.g., value of planarity on to the horizontal plane for each super points).

The similarity measure used in the implementation is the cosine one, given by the formula:

$$cs(e_i, e_j) = \frac{e_i \cdot e_j}{\|e_i\|\|e_j\|},$$

with $e_i$, $e_j$ the encodings of two super points.

Note that depending on the encoder, another similarity metric can be chosen (e.g., if a regularization on the latent space of the autoencoder is forced).

In this implementation, a super-point of the search area is matched to a super-point of the query if its similarity (e.g., cosine similarity) is above a threshold that is defined with respect to the encoder projection properties and the similarity the user desires. Using a set of super points manually annotated as similar or dissimilar for a target application, such a threshold can be obtained by computing the minimal similarity obtained between two super points labelled as similar. In this implementation the threshold is fixed to 0.8 based on such experiments.

At the end of this step, a set of n matched super-points in the search area ($SP_{rz}^1, \ldots, SP_{rz}^n$) is obtained with their corresponding matching $mq_i$ scores with the matched super points in the query (($mq_i, \ldots, mq_m$), ($mq_i, \ldots mq_k$)).

Super Point Encoding Grouping

This step of the implementation makes 3D bounding boxes detections from the set of matched super-points. Note that in the case where the object is composed of only one super-point, the bounding boxes proposals can directly be drawn around the matched super-point.

Up to this step, local descriptors (super-point features) were computed and compared between the query and the search area. In order to infer a set of plausible bounding boxes, relative position of the super points in the query (e.g., with respect to a referential point such as the center of the query) is used.

This relative position may be obtained by using the Hough Voting method for the center of the object, which has been previously explained. This relative position may alternatively be obtained by using the method for computing a graph from the set of super-points in the query, which has been previously discussed.

This implementation of the process outputs bounding boxes proposals. Since the similarity may depend on the application or the object, this implementation may comprise adding a similarity indication about the proposals. This helps a user to control how similar he/she wants his/her detected objects from the query. The method may for example comprise the display of the widget 130 of FIG. 13 which has already been discussed, so that the user may use this widget to set a similarity score threshold as previously discussed with reference to FIG. 13. Each detection result is associated to a similarity score (similarity rate) and the user can select a threshold to keep only the most convenient ones. In the widget of FIG. 13, a threshold of 84% as a similarity rate was selected.

This similarity may be application depending. It can then be based on several cues. The implementation may use the several ways to compute similarity metrics that can be obtained from the proposed bounding boxes and/or the matched super points which are listed below. Those similarity metrics can be used together to get a global similarity score or used separately depending on the target application. The metrics are the following;

Super points matching similarity score (spins): combination of matched super points matching scores (with the identified super point of the query) for a given proposal. Here ii is the number of superpoints in the query, $m_i$ the matching score for each of them in the proposal (if no match, $m_i$=0):

$$spms = \frac{\sum_{i=0}^{n} m_i}{n};$$

Color histogram comparison: very useful for certain applications where geometric information isn't sufficient and color information is available (e.g., extinguisher detection). This can be computed on all the points from the search area comprised in the bounding box or on the matched super points only; and Any global shape descriptors that can again be used on all the points from the search area comprised in the bounding box or on the matched super points only.

An example of 3D object detection according to the detection method is now discussed with reference to FIGS. 15 to 18. The example may for example be obtained with the previously-discussed implementation of the process integrating the learning method and the detection method.

Figure 15:
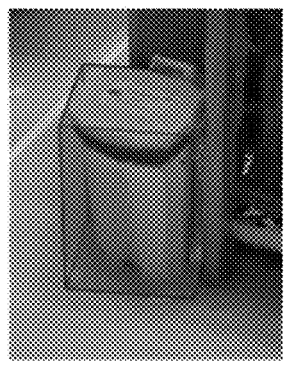
Figure 16:
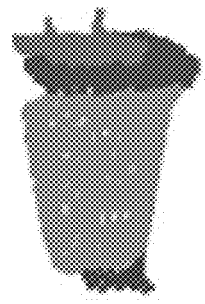
Figure 17:
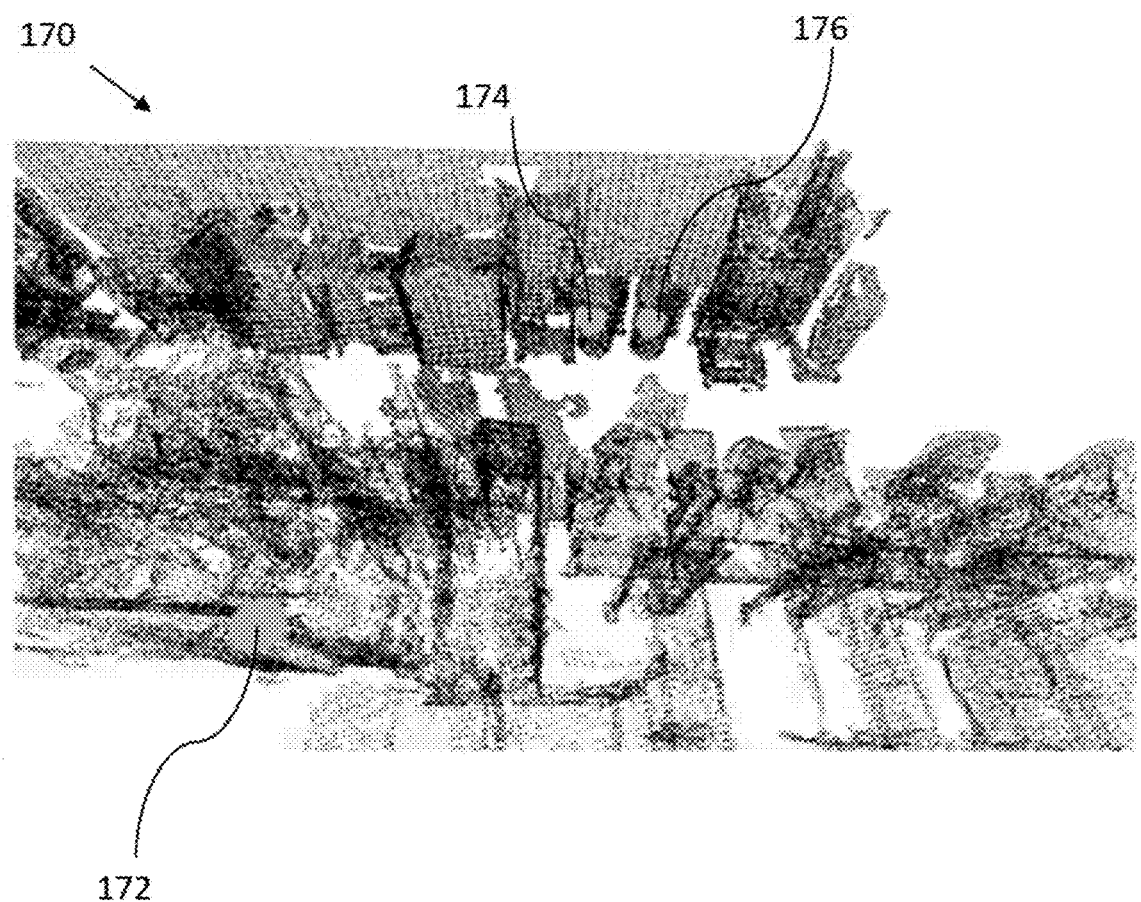
Figure 18:
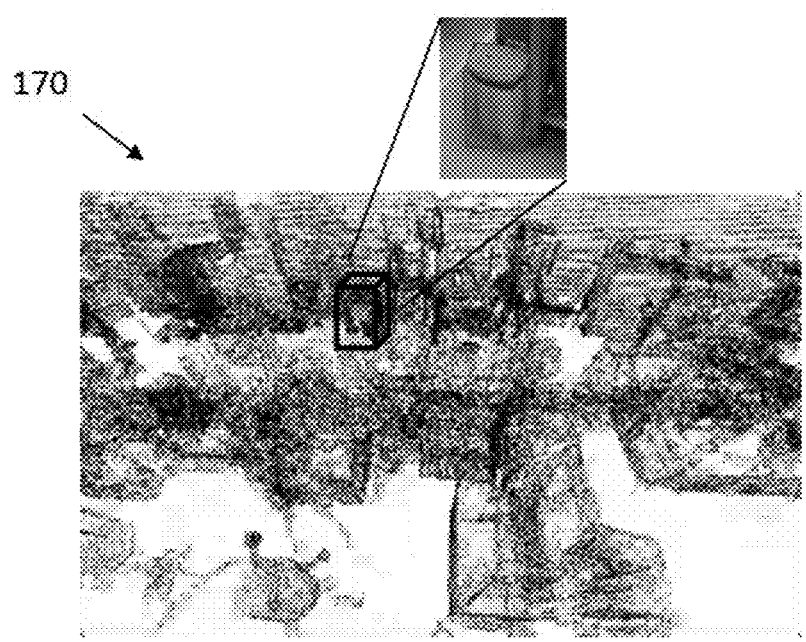

FIG. 15 shows a screenshot of the 3D object from which the query is extracted. The 3D object is a trash/dumpster. FIG. 15 shows a bounding box around the trash. FIG. 16 shows the super-points extracted from the trash, i.e., the super-points forming the query. FIG. 17 shows the search area 170. As shown on FIG. 17, as a result of the execution of the detection method, groups 172, 174 and 176 of super-points in the search area are detected. These groups represent trashes similar to that of FIG. 15. FIG. 18 shows the display of a bounding box around one detected similar trash in the search area 170. Only one bounding box is shown in FIG. 18, for illustration purposes, but it is to be understood that more bounding boxes could be displayed.

The learning method, the detection method, and the process integrating these methods are computer-implemented methods. This means that steps (or substantially all the steps) of the methods are executed by at least one computer, or any system alike. Thus, steps of the methods are performed by the computer, possibly fully automatically, or, semi-automatically. In examples, the triggering of at least some of the steps of the methods may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 19:
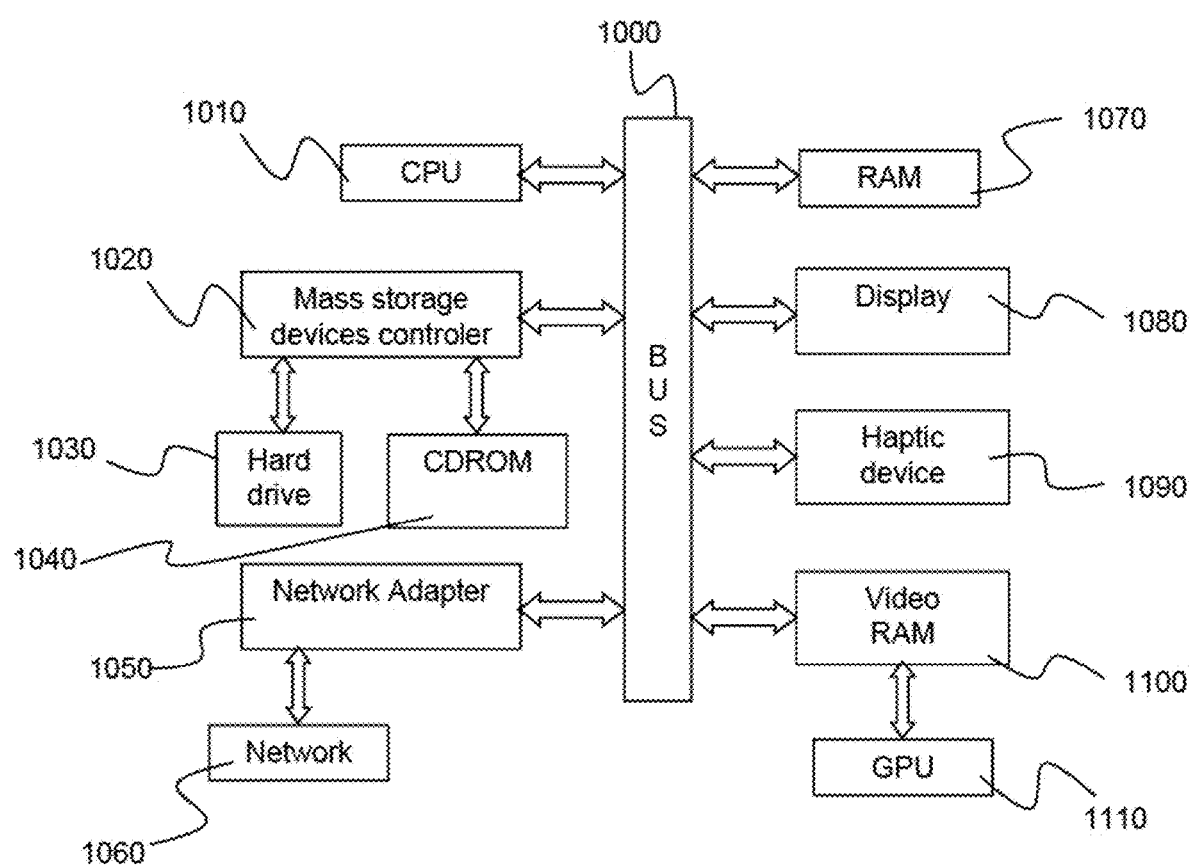
FIG. 19 shows an example of the system.

FIG. 19 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform one or more of the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the methods.

The invention claimed is:

1. A computer-implemented method of applying a neural network learnt according to machine-learning for learning a neural network configured to encode a super-point of a 3D point cloud into a latent vector, the method of machine-learning including obtaining a dataset of super-points, each super-point being a set of points of a 3D point cloud, the set of points representing at least a part of an object, and learning the neural network based on the dataset of super-points, the learning comprising minimizing a loss penalizing a disparity between two super-points, the method comprising:
obtaining one or more first super-points of a first 3D point cloud representing a 3D scene; and
obtaining one or more second super-points of a second 3D point cloud representing a 3D object;
encoding, by applying the neural network, the one or more first super-points each into a respective first latent vector and the one or more second super-points each into a respective second latent vector; and
determining a similarity between each first super-point of one or more first super-points and each second super-point of one or more second super-points, by, for said each first super-point and said each second super-point, computing a similarity measure between the respective first latent vector encoding the first super-point and the respective second latent vector encoding the second super-point,
wherein the obtaining the one or more first super-points further includes:
obtaining one or more initial super-points of the first 3D point cloud; and
filtering the one or more initial super-points by selecting, among the initial super-points, each initial super-point for which:
a disparity between dimensions of the respective initial super-point and dimensions of at least one second super-point of the one or more second super-points is smaller than a predefined threshold; and
a disparity between a position of the respective initial super-point and a position of at least one second super-point of the one or more second super-points is smaller than a predefined threshold,
the selected initial super-points being the one or more first super-points, and
wherein the filtering further includes selecting, among the initial super-points, each initial super-point for which:
a distance between each dimension of the super-point and a corresponding dimension of at least one second super-point of the one or more second super-points is smaller than a predefined threshold;
a ratio between each dimension of the super-point and a corresponding dimension of at least one second super-point of the one or more second super-points is smaller than a maximal ratio and larger than a minimal ratio; and
a difference between a relative height from a closest support surface of the super-point and a relative height from a closest support surface of at least one second super-point of the one or more second super-points is smaller than a predefined threshold.

2. The method of use of claim 1, wherein the method further comprises:
determining, among first super-points each having a determined similarity with at least one second super-point that is larger than a predefined threshold, one or more groups of first super-points, each group of first super-points having a similar shape than the second 3D point cloud.

3. The method of claim 2, wherein the determining of the one or more groups further comprises:
obtaining a graph of second super-points, the graph of second super-points having nodes each representing a second super-point and edges each representing a geometrical relation between the two super-points represented by the nodes connected by the edges and having one or more geometrical attributes of the geometrical relation; and
forming one or more graphs each having nodes representing each a first super-point, by constructing edges each connecting two nodes and each having one or more geometrical attributes similar to geometrical attributes of an edge of the graph of second super-points, each formed graph corresponding to a respective group.

4. The method of claim 3, further comprising, for each group, determining a similarity score by measuring a similarity of the first super-points in the group with the one or more second super-points.

5. A device comprising:
a processor; and
a computer readable data storage medium having recorded thereon
a computer program comprising instructions
for performing machine-learning for learning a neural network configured for encoding a super-point of a 3D point cloud into a latent vector by the processor being configured to obtain a dataset of super-points, each super-point being a set of points of a 3D point cloud, the set of points representing at least a part of an object, and learn the neural network based on the dataset of super-points, the learning comprising minimizing a loss penalizing a disparity between two super-points, and/or
for applying a neural network learnable according to the machine-learning by the processor being configured to:
obtain one or more first super-points of a first 3D point cloud representing a 3D scene, and
obtain one or more second super-points of a second 3D point cloud representing a 3D object,
encode, by applying the neural network, the one or more first super-points each into a respective first latent vector and the one or more second super-points each into a respective second latent vector; and
determine a similarity between each first super-point of one or more first super-points and each second super-point of one or more second super-points, by, for said each first super-point and said each second super-point, computing a similarity measure between the respective first latent vector encoding the first super-point and the respective second latent vector encoding the second super-point,
wherein the processor being configured to obtain the one or more first super-points further by being further configured to:
obtain one or more initial super-points of the first 3D point cloud; and
filter the one or more initial super-points by selecting, among the initial super-points, each initial super-point for which:
a disparity between dimensions of the respective initial super-point and dimensions of at least one second super-point of the one or more second super-points is smaller than a predefined threshold; and
a disparity between a position of the respective initial super-point and a position of at least one second super-point of the one or more second super-points is smaller than a predefined threshold,
the selected initial super-points being the one or more first super-points, and
wherein the processor is further configured to filter by being configured to select, among the initial super-points, each initial super-point for which:
a distance between each dimension of the super-point and a corresponding dimension of at least one second super-point of the one or more second super-points is smaller than a predefined threshold;
a ratio between each dimension of the super-point and a corresponding dimension of at least one second super-point of the one or more second super-points is smaller than a maximal ratio and larger than a minimal ratio; and
a difference between a relative height from a closest support surface of the super-point and a relative height from a closest support surface of at least one second super-point of the one or more second super-points is smaller than a predefined threshold.

6. The device of claim 5, wherein in the machine-learning, the loss is a reconstruction loss and the loss penalizes a disparity between a super-point and a reconstruction of the super-point.

7. The device of claim 6, wherein the disparity is a distance between the super-point and the reconstruction of the super-point.

8. The device of claim 5, wherein the processor is further configured to determine, among first super-points each having a determined similarity with at least one second super-point that is larger than a predefined threshold, one or more groups of first super-points, each group of first super-points having a similar shape than the second 3D point cloud.

9. The device of claim 8, wherein the processor is further configured to determine of the one or more groups by being configured to:
   obtain a graph of second super-points, the graph of second super-points having nodes each representing a second super-point and edges each representing a geometrical relation between the two super-points represented by the nodes connected by the edges and having one or more geometrical attributes of the geometrical relation, and
   form one or more graphs each having nodes representing each a first super-point, by constructing edges each connecting two nodes and each having one or more geometrical attributes similar to geometrical attributes of an edge of the graph of second super-points, each formed graph corresponding to a respective group.

10. The device of claim 9, wherein, for each group, the processor further configured to determine a similarity score by measuring a similarity of the first super-points in the group with the one or more second super-points.

11. A non-transitory computer readable medium having stored thereon a program that when executed by the computer causes the computer to implement the method according to claim 1.

12. The method of claim 1, wherein in the method of machine-learning the loss is a reconstruction loss and the loss penalizes a disparity between a super-point and a reconstruction of the super-point.

13. The method of claim 12, wherein in the method of machine-learning the disparity is a distance between the super-point and the reconstruction of the super-point.

14. The method of claim 13, wherein in the method of machine-learning the distance is a Chamfer distance or an Earth-Mover distance.

15. The method of claim 1, wherein in the method of machine-learning the learning is an unsupervised learning.

* * * * *